United States Patent
Fujiwara et al.

(10) Patent No.: US 8,249,780 B2
(45) Date of Patent: Aug. 21, 2012

(54) SEAT CONTROL DEVICE

(75) Inventors: Hiroyuki Fujiwara, Iida (JP); Masaru Kumagai, Utsunomiya (JP); Tatsuki Nagata, Utsunomiya (JP); Toshihiro Kawakami, Utsunomiya (JP)

(73) Assignee: OMRON Corporation, Kyoto (JP)

( * ) Notice: Subject to any disclaimer, the term of this patent is extended or adjusted under 35 U.S.C. 154(b) by 586 days.

(21) Appl. No.: 12/402,241

(22) Filed: Mar. 11, 2009

(65) Prior Publication Data
US 2009/0243356 A1  Oct. 1, 2009

(30) Foreign Application Priority Data

Mar. 27, 2008 (JP) ................... 2008-084425
Apr. 2, 2008 (JP) ................... 2008-095829
Apr. 22, 2008 (JP) ................... 2008-111385

(51) Int. Cl.
*B60N 2/01* (2006.01)
*B60N 2/06* (2006.01)
(52) U.S. Cl. ........................ 701/49; 297/257
(58) Field of Classification Search ........ 701/49
See application file for complete search history.

(56) References Cited

FOREIGN PATENT DOCUMENTS

| JP | 61166738 A | * | 7/1986 |
|----|------------|---|--------|
| JP | 07-061782 A | | 3/1995 |
| JP | 10166910 A | * | 6/1998 |
| JP | 2007-131138 A | | 5/2007 |

* cited by examiner

*Primary Examiner* — Thomas G. Black
*Assistant Examiner* — Sara Lewandroski
(74) *Attorney, Agent, or Firm* — Osha Liang LLP

(57) ABSTRACT

A seat control device has a first input unit for performing an operation of moving a first seat to a front side or a back side, a first drive control unit for moving the first seat to the front side or the back side based on an output of the first input unit, a second input unit for performing an operation of moving a second seat, positioned behind the first seat, to the front side or the back side, and a second drive control unit for moving the second seat to the front side or the back side based on an output of the second input unit. A control unit is arranged for prohibiting movement of the first seat and the movement of the second seat from being simultaneously carried out when the operation to move the first seat to the back side is performed at the first input unit and the operation to move the second seat to the front side is performed at the second input unit.

6 Claims, 24 Drawing Sheets

SEAT CONTROL DEVICE

BACKGROUND OF THE INVENTION

1. Technical Field

The present invention relates to a seat control device for controlling the horizontal position of a seat arranged in the interior of a vehicle.

2. Related Art

Most seats arranged in a vehicle such as an automobile have a seat control device enabling a seat position to be moved horizontally back and forth, which the seat control device may be a manual type in which the seat is moved by having a passenger operate an operation unit (lever etc.) arranged at the lower part of the seat, or the like, or may be an electrically operated type in which the seat is moved by having the passenger operate an input unit (switch etc.) arranged at the side of the seat, or the like.

In particular, in the electrically operated seat control device, the seat is moved based on an output of the input unit if the operation amount of the input unit is small, and the seat is automatically moved to the most front or the most back position if the operation amount of the input unit is large.

In recent years, the seat control device is arranged not only at a driver's seat and a front passenger's seat, which is located next to the driver's seat, but also at each back seat in a back row, and thus the passenger himself/herself can set an optimum seat position at each seat. In place of the manual seat control device, which has been the mainstream in the related art, the electrically operated seat control device is beginning to be widely used so that the seat position can be more easily set.

Japanese Examined Patent Publication No. 7-61782 describes an orientation control device for detecting the presence of seating on a seat behind a front row seat when a drive instruction for moving the front row seat backward is made, detecting whether or not the front row seat exceeds a backward limit position stored in advance if seating is detected, and moving the front row seat backward only when the backward limit position is not exceeded.

Japanese Unexamined Patent Publication No. 2007-131138 describes a foreign material trapping detection device for detecting trapping of a foreign material by measuring the fluctuation in seat driving force for every predetermined movement distance, and comparing the fluctuation amount with a threshold value, which is a fluctuation range value defined by a predetermined calculation.

SUMMARY

In such a seat control device, when the passenger seated on a seat of the first row moves the seat backward, and the passenger seated on a seat of the second row positioned behind the seat of the first row moves the seat forward, the foot, or the like of the passenger seated on the seat of the second row may get trapped from two directions by both seats.

One or more embodiments of the present invention provides a seat control device capable of suppressing trapping of an object between the front row seat and the back row seat.

In accordance with one aspect of the present invention, a seat control device includes a first input unit for performing an operation of moving a first seat to a front side or a back side; a first drive control unit for moving the first seat to the front side or the back side based on an output of the first input unit; a second input unit for performing an operation of moving a second seat, positioned behind the first seat, to the front side or the back side; and a second drive control unit for moving the second seat to the front side or the back side based on an output of the second input unit; wherein when the operation to move the first seat to the back side is performed at the first input unit and the operation to move the second seat to the front side is performed at the second input unit, movement of the first seat and the movement of the second seat are prohibited from being simultaneously carried out.

Accordingly, when operations of approaching the front row seat and the back row seat are performed at the first input unit and the second input unit, respectively, the movement of the front row seat and the movement of the back row seat are prohibited from being simultaneously carried out, and thus trapping of an object between the front row seat and the back row seat can be suppressed.

In the seat control device according to one or more embodiments of the present invention, control means may stop the movement of the seat based on the output of the input unit operated before, and prohibit the movement of the seat based on the output of the input unit operated after.

Therefore, since the movement of either the first seat or the second seat, which are in front and back relationship to each other, is stopped, and the movement of the other seat is prohibited, the seats are avoided from approaching each other, whereby trapping of an object between the front row seat and the back row seat can be suppressed.

In the seat control device according to one or more embodiments of the present invention, the control means may stop the movement of the seat based on the output of the input unit operated before, and execute the movement of the seat based on the output of the input unit operated after.

Therefore, even if either the first seat or the second seat, which are in front and back relationship to each other, moves, the movement of the other seat is stopped, and thus the seats are avoided from approaching each other, whereby an object between the front row seat and the back row seat is prevented from being trapped from two directions by the seats.

In the seat control device according to tone or more embodiments of the present invention, the control means may execute the movement of the seat based on the output of the input unit operated before, and prohibit the movement of the seat based on the output of the input unit operated after.

Therefore, even if either the first seat or the second seat, which are in front and back relationship to each other, moves, the movement of the other seat is prohibited, and thus the seats are avoided from approaching each other, whereby an object between the front row seat and the back row seat is prevented from being trapped from two directions by the seats.

According to one or more embodiments of the present invention, when operations of approaching the front row seat and the back row seat are performed at the first input unit and the second input unit, respectively, the movement of the front row seat and the movement of the back row seat are prohibited from being simultaneously carried out, and thus trapping of an object between the front row seat and the back row seat can be suppressed.

DETAILED DESCRIPTION

Figure 1:
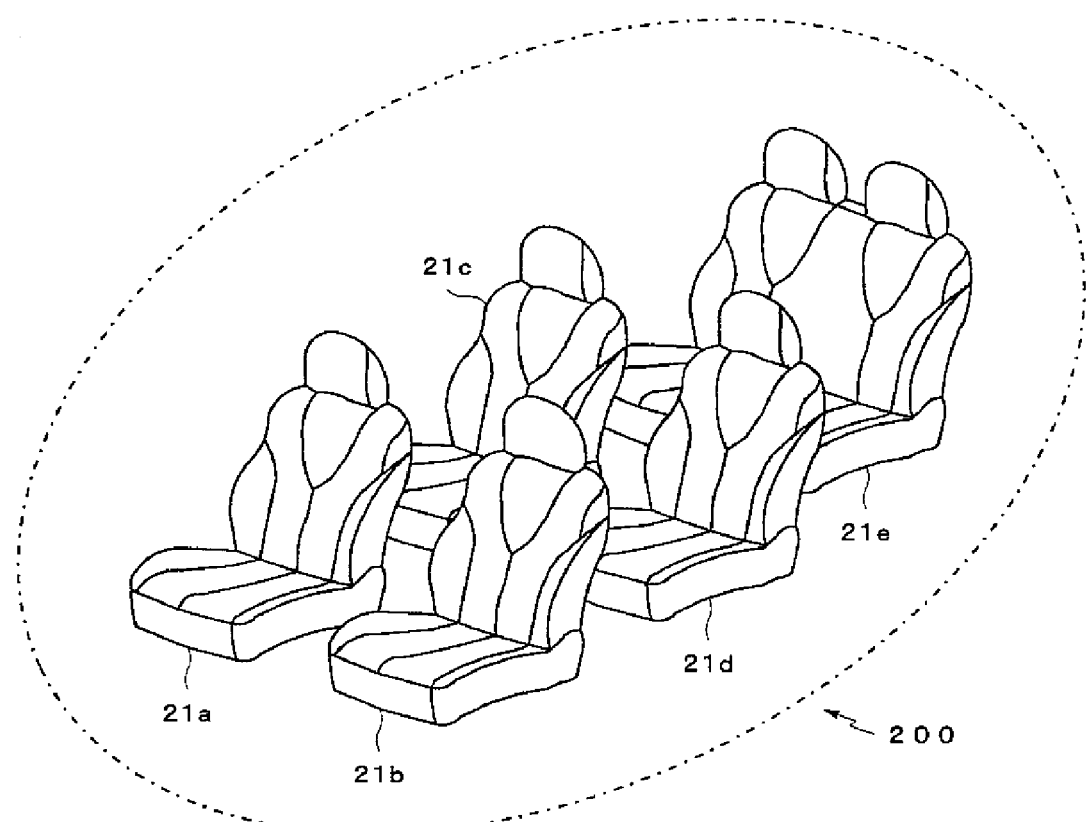
FIG. 1 is a view showing the seats arranged in the interior of a vehicle.

Hereinafter, preferred embodiments of the present invention will be described with reference to the drawings.

Like reference numerals are denoted for similar portions or corresponding portions throughout FIGS. 1 to 14, to be hereinafter described.

FIG. 1 is a view showing a vehicle 200 and seats 21a to 21e arranged in the interior of the vehicle 200 applied with a seat control device according to one or more embodiments of the present invention.

The vehicle 200 is a so-called three-row seat vehicle, where the seat 21a is the driver's seat arranged on the first row, and the seat 21b is the front passenger's seat arranged on the first row. The seat 21c is the seat on the second row arranged behind the seat 21a, and the seat 21d is the seat on the second row arranged behind the seat 21b. The seat 21e is the seat on the third row arranged behind the seats 21c, 21d. Only the seat 21e is formed as a two-seater.

Figure 4:
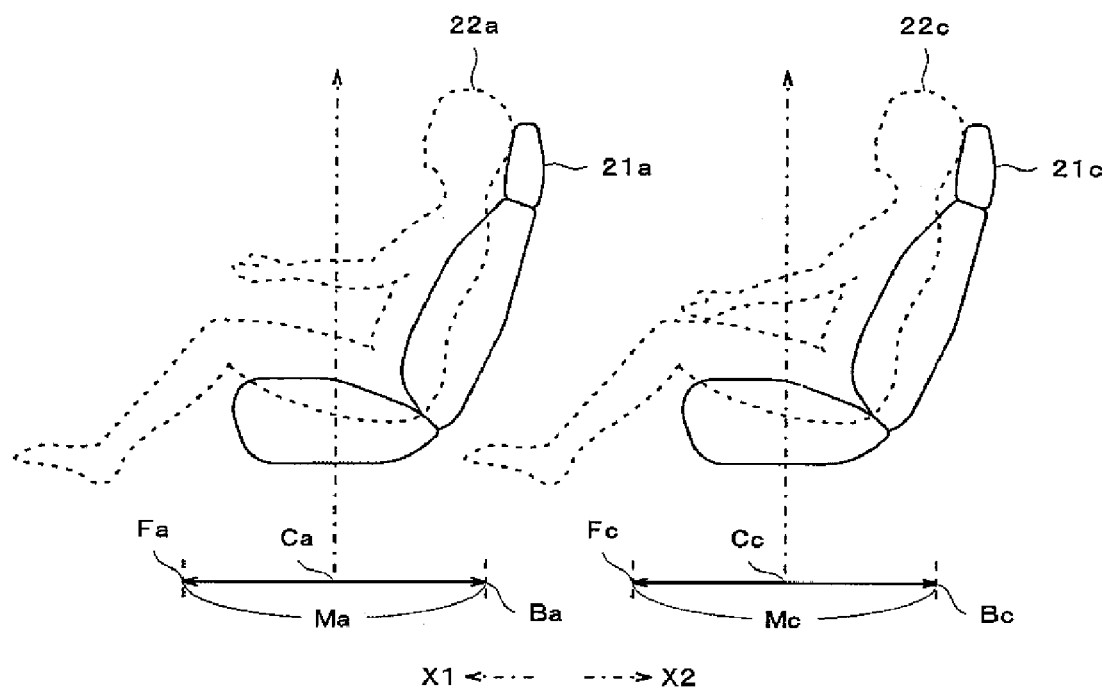
FIG. 4 is a view showing one example of a positional relationship between a front row seat and a back row seat arranged in the interior of the vehicle.
Figure 5:
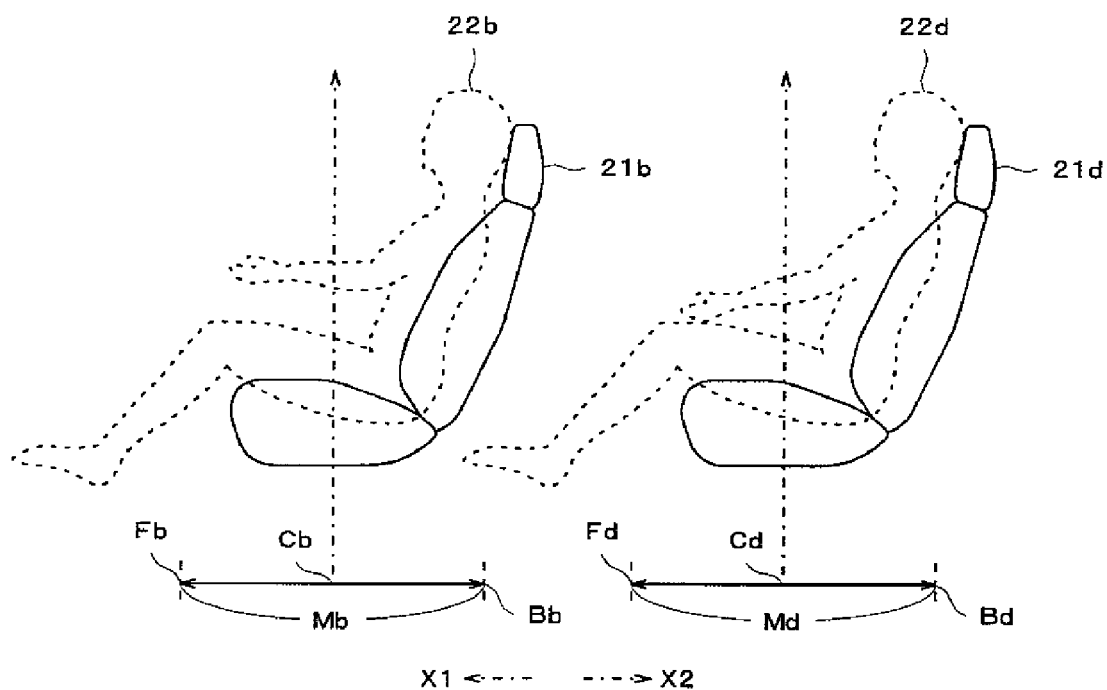
FIG. 5 is a view showing one example of a positional relationship between the front row seat and the back row seat arranged in the interior of the vehicle.

The seats 21a, 21c are arranged so as to be horizontally movable in the interior of the vehicle 200, as shown in FIG. 4, and the seats 21b, 21d are arranged so as to be horizontally movable in the interior of the vehicle 200, as shown in FIG. 5.

In FIGS. 4 and 5, X1 indicates the forward direction of each seat in the horizontal movement, and X2 indicates the backward direction of each seat in the horizontal movement.

In FIG. 4, Fa is the forward limit position (hereinafter described as a "front end position") of the seat 21a in the X1 direction, Ba is the backward limit position (hereinafter described as a "back end position") of the seat 21a in the X2 direction, Fc is the front end position of the seat 21c, and Bc is the back end position of the seat 21c.

The range (hereinafter described as a "predetermined range") from the front end position Fa to the back end position Ba is indicated as Ma in the figure, and the range (hereinafter described as a "predetermined range") from the front end position Fc to the back end position Bc is indicated as Mc in the figure. The center position in the predetermined range Ma is indicated as Ca in the figure, and the center position in the predetermined range Mc is indicated as Cc in the figure.

The suitable position of the seat 21a in the interior of the vehicle 200 is the center position Ca, and the suitable position of the seat 21c in the interior of the vehicle 200 is the center position Cc. Furthermore, 22a indicates the passenger seated on the seat 21a, and 22c indicates the passenger seated on the seat 21c.

Similar to the above, in FIG. 5, Fb is the front end position of the seat 21b, Bb is the back end position of the seat 21b, Fd is the front end position of the seat 21d, and Bd is the back end position of the seat 21d.

The range (hereinafter described as a "predetermined range") from the front end position Fb to the back end position Bb is indicated as Mb in the figure, and the range (hereinafter described as a "predetermined range") from the front end position Fd to the back end position Bd is indicated as Md in the figure. The center position in the predetermined range Mb is indicated as Cb in the figure, and the center position in the predetermined range Md is indicated as Cd in the figure.

The suitable position of the seat 21b in the interior of the vehicle 200 is the center position Cb, and the suitable position of the seat 21d in the interior of the vehicle 200 is the center position Cd. Furthermore, 22b indicates the passenger seated on the seat 21b, and 22d indicates the passenger seated on the seat 21d.

The seat 21e is arranged in a fixed manner in the interior of the vehicle 200. The seat 21e is not relevant to embodiments of the present invention, and thus the description thereof will not be given below.

In the embodiment of the seat control device to be hereinafter described, the back row seat is the seat 21c when the front row seat is the seat 21a, and the back row seat is the seat 21d when the front row seat is the seat 21b. Therefore, the seats 21a, 21b configure one embodiment of a first seat according to one or more embodiments of the present invention, and the seats 21c, 21d configure one embodiment of a second seat in according to one or more embodiments of the present invention.

Figure 2:
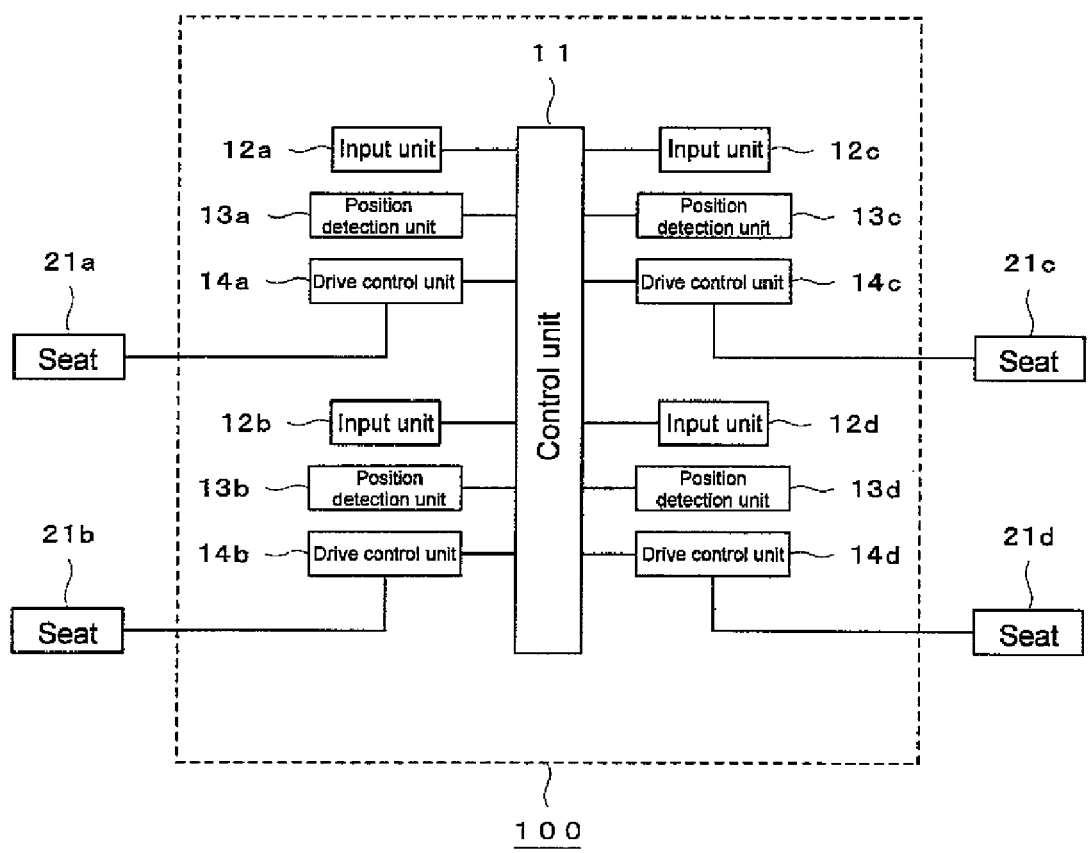
FIG. 2 is a block diagram showing a seat control device according to an embodiment of the present invention.

FIG. 2 is a block diagram showing a seat control device according to one or more embodiments of the present invention.

In the figure, a seat control device 100 controls the respective seats 21a to 21d, and the seat control device 100 includes a control unit 11, input units 12a to 12d, position detection units 13a to 13d, and drive control units 14a to 14d, to be hereinafter described.

The control unit 11 includes a CPU (Central Processing Unit), and the like, and controls each unit of the seat control device 100 in an integrated manner. The control unit 11 configures a control means in one or more embodiments of the present invention.

Each of the input units 12a to 12d (hereinafter collectively indicated with reference numeral 12) includes a switch etc. of a shape shown in FIG. 3, and is arranged at the side of each of the seats 21a to 21d, or the inner side of a door (not shown) near the seat.

Figure 3:
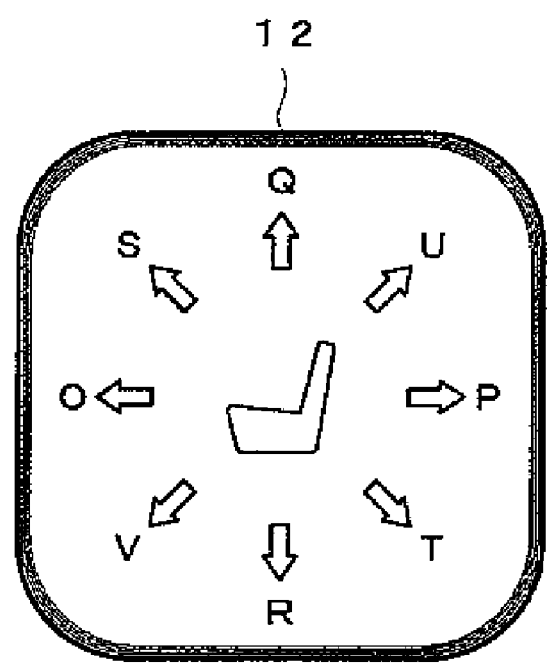
FIG. 3 is a view showing one example of an input unit.

In FIG. 3, O to V are pushing directions of the input unit 12 set by control, where the input unit 12 is pushed to the O direction when moving the seat forward in the X1 direction (FIG. 4), and is pushed to the P direction when moving the seat backward in the X2 direction (FIG. 4).

The input unit 12 is pushed to the Q direction when vertically moving the seat upward, and pushed to the R direction when vertically moving the seat downward. Furthermore, the input unit 12 is pushed to the S direction or the V direction when inclining the backrest of the seat forward, and pushed to the U direction or the T direction when inclining the backrest backward. The pushing directions O to V are not relevant to embodiments of the present invention, and thus the description thereof will not be given below.

The operation for controlling the seat 21a (e.g., movement in the horizontal direction or vertical direction) is performed at the input unit 12a, and the operation for controlling the seat 21b is performed at the input unit 12b. Furthermore, the operation for controlling the seat 21c is performed at the input unit 12c, and the operation for controlling the seat 21d is performed at the input unit 12d.

Therefore, the input units 12a, 12b configure a first input unit according to one or more embodiments of the present invention, and the input units 12c, 12d configure a second unit according to one or more embodiments of the present invention.

Each of the position detection units 13a to 13d includes a position sensor (not shown), an EEPROM (not shown) for storing the position detected by the position sensor, and the like, and sequentially detects each position within each predetermined range during the movement of each seat, and stores a stopped position within each predetermined range after the movement of each seat is completed.

Specifically, when the seat 21a is moved forward or backward in the X1 or the X2 direction, the position detection unit 13a sequentially detects the position of the seat within the predetermined range Ma (FIG. 4), and stores the stopped position of the seat within the predetermined range Ma when the movement of the seat 21a is completed.

When the seat 21b is moved forward or backward in the X1 or the X2 direction, the position detection unit 13b sequentially detects the position of the seat within the predetermined range Mb (FIG. 5), and stores the stopped position of the seat within the predetermined range Mb when the movement of the seat 21b is completed.

When the seat 21c is moved forward or backward in the X1 or the X2 direction, the position detection unit 13c sequentially detects the position of the seat within the predetermined range Mc (FIG. 4), and stores the stopped position of the seat within the predetermined range Mc when the movement of the seat 21c is completed.

When the seat 21d is moved forward or backward in the X1 or the X2 direction, the position detection unit 13d sequentially detects the position of the seat within the predetermined range Md (FIG. 5), and stores the stopped position of the seat within the predetermined range Md when the movement of the seat 21d is completed.

Each of the drive control unit 14a to 14d includes a slide motor (not shown), and the like, and moves each of the seats 21a to 21d forward or backward in the X1 direction or the X2 direction based on the output of each of the input units 12a to 12d.

Specifically, the drive control unit 14a moves the seat 21a forward or backward in the X1 or the X2 direction based on the output of the input unit 12a, and the drive control unit 14b moves the seat 21b forward or backward in the X1 or the X2 direction based on the output of the input unit 12b. Furthermore, the drive control unit 14c moves the seat 21c forward or backward in the X1 or the X2 direction based on the output of the input unit 12c, and the drive control unit 14d moves the seat 21d forward or backward in the X1 or the X2 direction based on the output of the input unit 12d.

Therefore, the drive control units 14a, 14b configure one embodiment of a first drive control unit according to one or more embodiments of the present invention, and the drive control units 14c, 14d configure one embodiment of a second drive control unit according to one or more embodiments of the present invention.

In the seat control device 100 of the present embodiment, the passenger 22a (FIG. 4) operates the input unit 12a to move the seat 21a forward or backward in the X1 or the X2 direction, and the passenger 22c operates the input unit 12c to move the seat 21c forward or backward in the X1 or the X2 direction. The operation is the same as the seats 21a, 21c when moving the seats 21b, 21d forward or backward in the X1 or the X2 direction other than that the input units is 12b and 12d, and thus the description thereof will not be given below.

When the passenger 22a pushes the input unit 12a to the O direction (hereinafter referred to as a "front side") of FIG. 3, the seat 21a moves forward in the X1 direction within the predetermined range Ma, and when the passenger 22a pushes the input unit 12a to the P direction (hereinafter referred to as a "back side") of FIG. 3, the seat 21a moves backward in the X2 direction within the predetermined range Ma.

Similarly, when the passenger 22c pushes the input unit 12c to the front side, the seat 21c moves forward in the X1 direction within the predetermined range Mc, and when the passenger 22c pushes the input unit 12c to the back side, the seat 21c moves backward in the X2 direction within the predetermined range Mc.

In the case of the present embodiment, the operation amount of the input unit is the pushing time to the predetermined direction with respect to the input unit. If the operation amount is small, that is, if the pushing time to the front side or the back side with respect to the input unit 12a is within a predetermined time t (e.g., one second), the seat 21a moves forward or backward by a predetermine distance in the X1 or the X2 direction based on the pushing time; and if the pushing time to the front side or the back side with respect to the input unit 12c is within a predetermined time (e.g., one second), the seat 21c moves forward or backward by a predetermine distance in the X1 or the X2 direction based on the pushing time.

If the operation amount is large, that is, if the pushing time to the front side or the back side with respect to the input unit 12a exceeds the predetermined time (e.g., one second), the seat 21a automatically moves to the front end position Fa (FIG. 4) or the back end position Ba (FIG. 4); and if the pushing time to the front side or the back side with respect to the input unit 12c exceeds the predetermined time (e.g., one second), the seat 21c automatically moves to the front end position Fc (FIG. 4) or the back end position Bc (FIG. 4).

Thus, when the passenger 22a pushes the input unit 12a to the back side and the passenger 22c pushes the input unit 12c to the front side, the seat 21a moves backward in the X2 direction and the seat 21c moves forward in the X1 direction, so that the seat 21a and the seat 21c approach each other.

Figure 6:
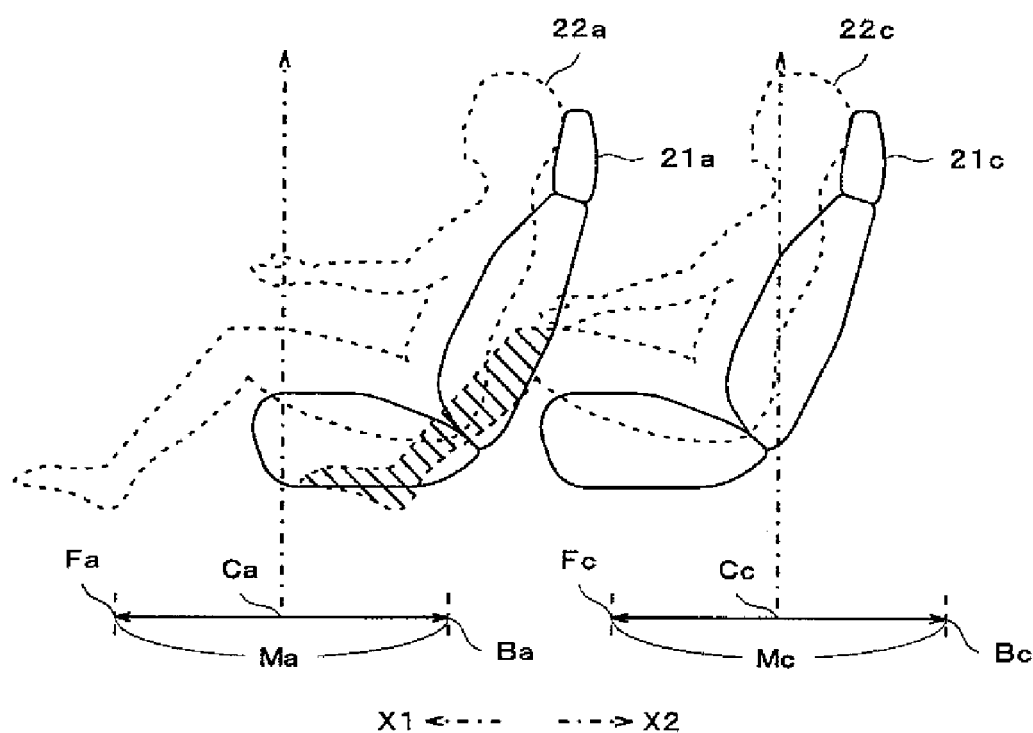
FIG. 6 is a view showing a trapped event that occurs between a front row seat and a back row seat arranged in the compartment of the vehicle.

In particular, when the pushing time at the input units 12a, 12c is long, the seat 21a greatly moves backward in the X2 direction and the seat 21c greatly moves forward in the X1 direction, and thus the positional relationship of the seats 21a, 21c and the passengers 22a, 22c in the vehicle 200 becomes the state shown in FIG. 6. That is, the foot (shaded portion in FIG. 6) of the passenger 22c is trapped between the seat 21a and the seat 21c in a compressed state.

Therefore, in the seat control device 100 according to an embodiment of the present invention, the seat control, described hereinafter, is performed to prevent trapping of an object (e.g., foot of the passenger) between the seat (e.g., seat 21a) on the front side and the seat (e.g., seat 21c) on the back side.

The operation of the seat control device 100 (FIG. 2) according to an embodiment of the present invention will now be described with reference to the drawings.

Only the control operation of the two seats (e.g., seat 21a and seat 21c of FIG. 1) in a front and back relationship with each other will be described below, and the description on the two seats (e.g., seat 21a and seat 21b of FIG. 1) in parallel relationship or the two seats (e.g., seat 21a and seat 21d of FIG. 1) not in the front and back relationship or the parallel relationship will not be given since it is irrelevant to embodiments of the present invention.

In the compartment of the vehicle 200, the seats in the front and back relationship to each other are the seat 21a and the seat 21c, and the seat 21b and the seat 21d, where the description on the control operation of the seat 21b and the seat 21d will not be given below since the operation of the seat control device 100 to be hereinafter described is the same in both cases.

(1) When Front Seat Control Operation is Before, and Back Seat Control Operation is after First, the operation of the seat control device 100 when the operation for moving the seat 21a forward or backward in the X1 or the X2 direction (FIG. 4) is performed at the input unit 12a (FIG. 2) before, and the operation for moving the seat 21c forward or backward in the X1 or the X2 direction is performed at the input unit 12c (FIG. 2) after will be specifically described using the flowcharts of FIGS. 7 to 9, and 13.

Figure 7:
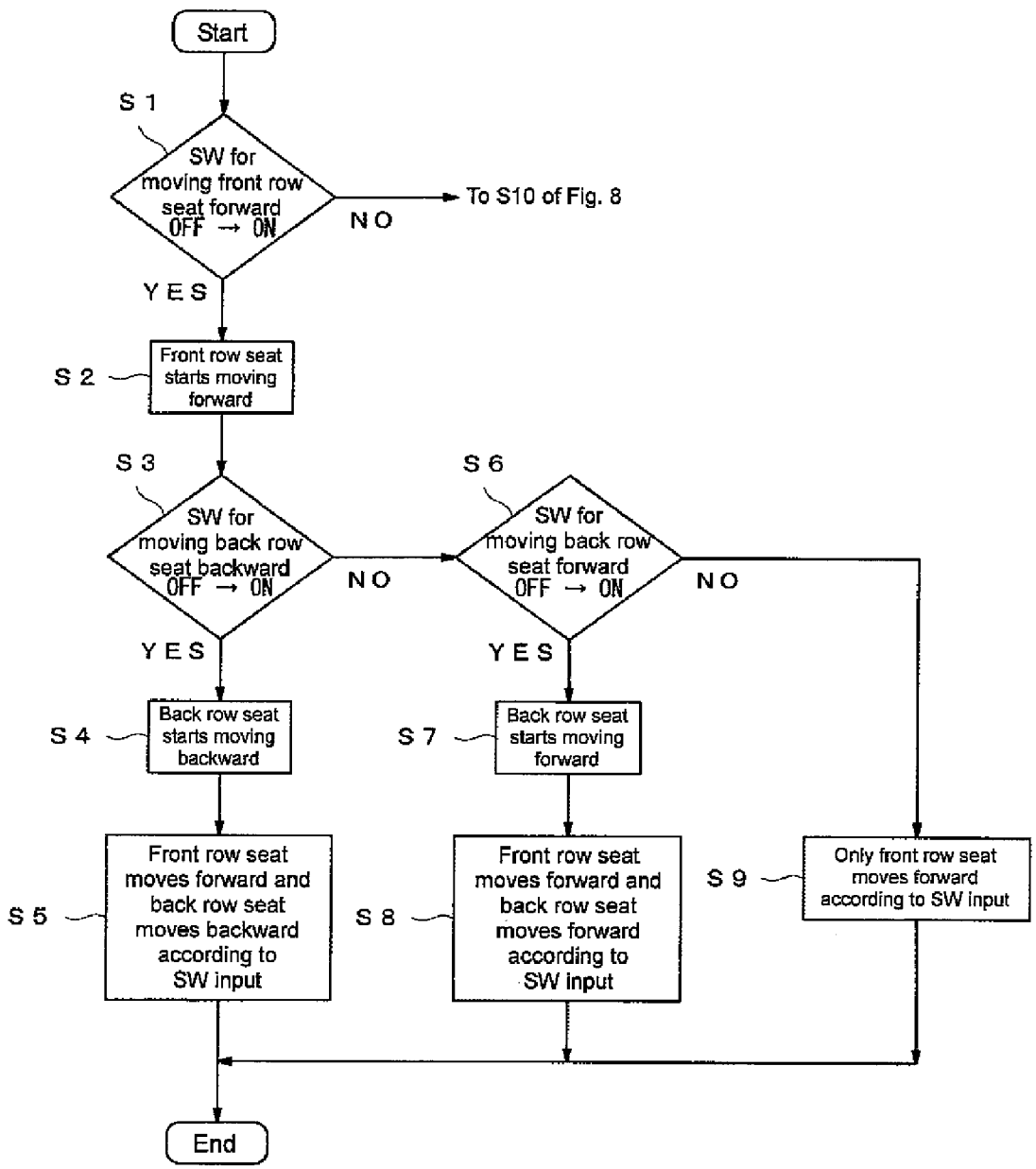
FIG. 7 is a flowchart showing the operation of the seat control device according to an embodiment of the present invention.

In step S1 of FIG. 7, the control unit 11 (FIG. 2) verifies whether or not the switch for moving the front row seat forward is switched from the "OFF" state to the "ON" state, that is, whether or not the input unit 12a is pushed to the front side (O direction of FIG. 3) by the passenger 22a (FIG. 4) seated on the seat 21a, where the process proceeds to step S2 if pushed to the front side (step S1: YES), and the process proceeds to after step S10 of FIG. 8 if not pushed to the front side (step S1: NO).

In step S2, the front row seat starts the forward movement operation according to the verification result of step S1. Specifically, since the input unit 12a is pushed to the front side by the passenger 22a, the drive control unit 14a (FIG. 2) starts the drive to move the seat 21a forward under the control of the control unit 11. The seat 21a then starts the forward movement operation in the X1 direction.

In step S3, the control unit 11 verifies whether or not the switch for moving the back row seat backward is switched from the "OFF" state to the "ON" state, that is, whether or not the input unit 12c is pushed to the back side (P direction of FIG. 3) by the passenger 22c (FIG. 4) seated on the seat 21c, where the process proceeds to step S4 if pushed to the back side (step S3: YES), and the process proceeds to after step S6 if not pushed to the back side (step S3: NO).

In step S4, the back row seat starts the backward movement operation according to the verification result of step S3. Specifically, since the input unit 12c is pushed to the back side by the passenger 22c, the drive control unit 14c (FIG. 2) starts the drive to move the seat 21c backward under the control of the control unit 11. The seat 21c then starts the backward movement operation in the X2 direction.

In step S5, the front row seat that started the forward movement operation in step S2 moves forward based on the output of the switch related to the relevant operation, and the back row seat that started the backward movement operation in step S4 moves backward based on the output of the switch related to the relevant operation.

Specifically, if the time the passenger 22a pushed the input unit 12a in step S1 is within the predetermined time t, mentioned above, the seat 21a moves forward in the X1 direction by a predetermined distance based on the pushing time, that is, the output of the input unit 12a within the predetermined range Ma (FIG. 4). If the time the passenger 22a pushed the input unit 12a exceeds the predetermined time, the seat 21a automatically moves forward up to the front end position Fa (FIG. 4) within the predetermined range Ma.

Similar to the above, if the time the passenger 22c pushed the input unit 12c in step S3 is within the predetermined time t, mentioned above, the seat 21c moves backward in the X2 direction by a predetermined distance based on the pushing time, that is, the output of the input unit 12c within the predetermined range Mc (FIG. 4). If the time the passenger 22c pushed the input unit 12c exceeds the predetermined time, the seat 21c automatically moves backward up to the back end position Bc (FIG. 4) within the predetermined range Mc.

The seat control for this time is terminated as soon as the movement of the front row seat and the back row seat, that is, the seats 21a, 21c is completed to prepare for the next seat control.

In step S6, the control unit 11 verifies whether or not the switch for moving the back row seat forward is switched from the "OFF" state to the "ON" state, that is, whether or not the input unit 12c is pushed to the front side by the passenger 22c according to the verification result of step S3, where the process proceeds to step S7 if pushed to the front side (step S6: YES), and the process proceeds to step S9 if not pushed to the front side (step S6: NO).

In step S7, the back row seat starts the forward movement operation according to the verification result of step S6. Specifically, since the input unit 12c is pushed to the front side by the passenger 22c, the drive control unit 14c starts the drive to move the seat 21c forward under the control of the control unit 11. The seat 21c then starts the forward movement operation in the X1 direction.

In step S8, the front row seat that started the forward movement operation in step S2 moves forward based on the output of the switch related to the relevant operation, and the back row seat that started the forward movement operation in step S7 moves forward based on the output of the switch related to the relevant operation.

Specifically, if the time the passenger 22c pushed the input unit 12c in step S6 is within the predetermined time t, the seat 21c moves forward in the X1 direction by a predetermined distance based on the pushing time, that is, the output of the input unit 12c within the predetermined range Mc. If the time the passenger 22c pushed the input unit 12c exceeds the predetermined time, the seat 21c automatically moves forward up to the front end position Fc (FIG. 4) within the predetermined range Mc. The forward movement operation in step S8 of the front row seat, that is, the seat 21a that started the forward movement operation in step S2 is similar to step S5, and thus the description thereof will not be given.

The seat control for this time is terminated as soon as the movement of the front row seat and the back row seat, that is, the seats 21a, 21c is completed to prepare for the next seat control.

In step S9, only the front row seat, that is, the seat 21a that started the forward movement operation in step S2 moves forward based on the output of the switch related to the relevant operation according to the verification results of steps S1, S3, and S6. The forward movement operation in step S9 of the seat 21a is similar to step S5, and thus the description thereof will not be given.

The seat control for this time is terminated as soon as the movement of the front row seat, that is, the seat 21a is completed to prepare for the next seat control.

Figure 8:
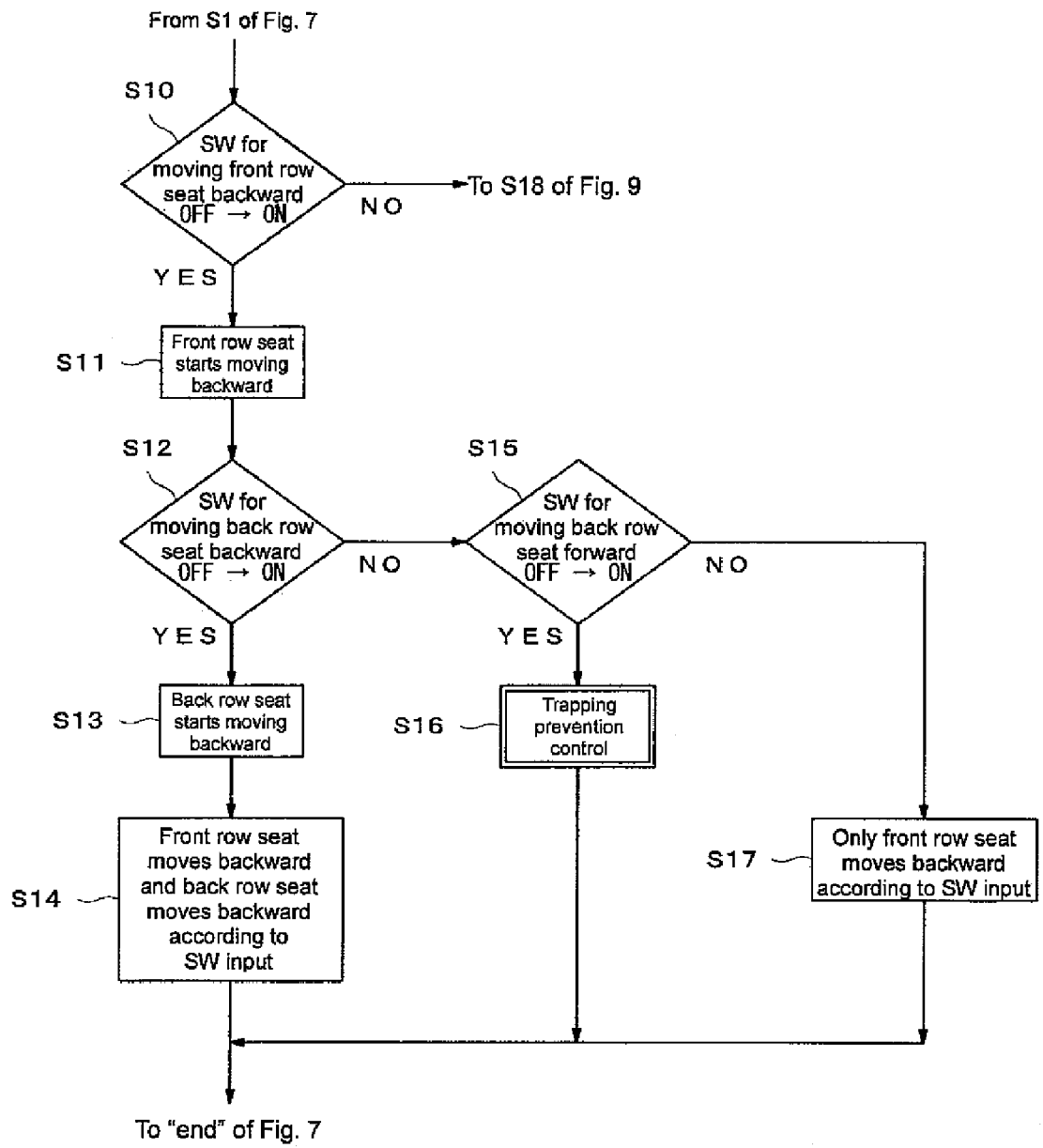
FIG. 8 is a flowchart showing the operation of the seat control device according to an embodiment of the present invention.

In step S10 of FIG. 8, the control unit 11 verifies whether or not the switch for moving the front row seat backward is switched from the "OFF" state to the "ON" state, that is, whether or not the input unit 12a is pushed to the back side by the passenger 22a according to the verification result of step S1 (FIG. 7), where the process proceeds to step S11 if pushed to the back side (step S10: YES), and the process proceeds to after step S18 of FIG. 9 if not pushed to the back side (step S10: NO).

In step S11, the front row seat starts the backward movement operation according to the verification result of step S10. Specifically, since the input unit 12a is pushed to the back side by the passenger 22a, the drive control unit 14a starts the drive to move the seat 21a backward under the control of the control unit 11. The seat 21a then starts the backward movement operation in the X2 direction.

In step S12, the control unit 11 verifies whether or not the switch for moving the back row seat backward is switched from the "OFF" state to the "ON" state, that is, whether or not the input unit 12c is pushed to the back side by the passenger 22c, where the process proceeds to step S13 if pushed to the back side (step S12: YES), and the process proceeds to after step S15 if not pushed to the back side (step S12: NO).

In step S13, the back row seat starts the backward movement operation according to the verification result of step S12. The details related to the start of the backward movement operation of the back row seat, that is, the start of the backward movement operation in the X2 direction of the seat 21c are similar to step S4 (FIG. 7), and thus the description thereof will not be given.

In step S14, the front row seat that started the backward movement operation in step S11 moves backward based on the output of the switch related to the relevant operation, and the back row seat that started the backward movement operation in step S13 moves backward based on the output of the switch related to the relevant operation.

Specifically, if the time the passenger 22a pushed the input unit 12a in step S10 is within the predetermined time t, the seat 21a moves backward in the X2 direction by a predetermined distance based on the pushing time, that is, the output of the input unit 12a within the predetermined range Ma. If the time the passenger 22a pushed the input unit 12a exceeds the predetermined time, the seat 21a automatically moves backward up to the back end position Ba (FIG. 4) within the predetermined range Ma. The back row seat that started the backward movement operation in step S13, that is, the backward movement operation in step S14 of the seat 21c is similar to step S5 (FIG. 7), and thus the description thereof will not be given.

The seat control for this time is terminated as soon as the movement of the front row seat and the back row seat, that is, the seats 21a, 21c is completed to prepare for the next seat control.

In step S15, the control unit 11 verifies whether or not the switch for moving the back row seat forward is switched from the "OFF" state to the "ON" state, that is, whether or not the input unit 12c is pushed to the front side by the passenger 22c according to the verification result of step S12, where the process proceeds to step S16 if pushed to the front side (step S15: YES), and the process proceeds to step S17 if not pushed to the front side (step S15: NO).

If the determination of step S15 is YES, the forward movement of the back row seat is started, under normal circumstances, during the backward movement of the front row seat according to the verification results of steps S1 (FIG. 7), S10, S12, and S15.

When the front row seat moves backward and the back row seat moves forward, the seats approach each other as in FIG. 6, and an object between the front row seat and the back row seat such as the foot (shaded portion in FIG. 6) of the passenger 22c seated on the seat 21c may get trapped from two directions (X1 direction and X2 direction) by the seats 21a, 21c depending on the movement amount of each seat.

In the seat control device 100 according to an embodiment of the present invention, the seat control for preventing such trapping is performed in step S16.

Specifically, in a first example of the present embodiment, the movement of the seat based on the output of the input unit operated before is stopped, and the movement of the seat based on the output of the input unit operated after is prohibited. In other words, the backward movement of the seat 21a based on the output of the input unit 12a is stopped and the forward movement of the seat 21c based on the output of the input unit 12c is prohibited in step S16.

In a second example of the present embodiment, the movement of the seat based on the output of the input unit operated before is stopped, and the movement of the seat based on the output of the input unit operated after is executed. In other words, the backward movement of the seat 21a based on the output of the input unit 12a is stopped and the forward movement of the seat 21c based on the output of the input unit 12c is executed in step S16.

In a third example of the present embodiment, the movement of the seat based on the output of the input unit operated before is executed, and the movement of the seat based on the output of the input unit operated after is prohibited. In other words, the backward movement of the seat 21a based on the output of the input unit 12a is executed and the forward movement of the seat 21c based on the output of the input unit 12c is prohibited in step S16.

Figure 13:
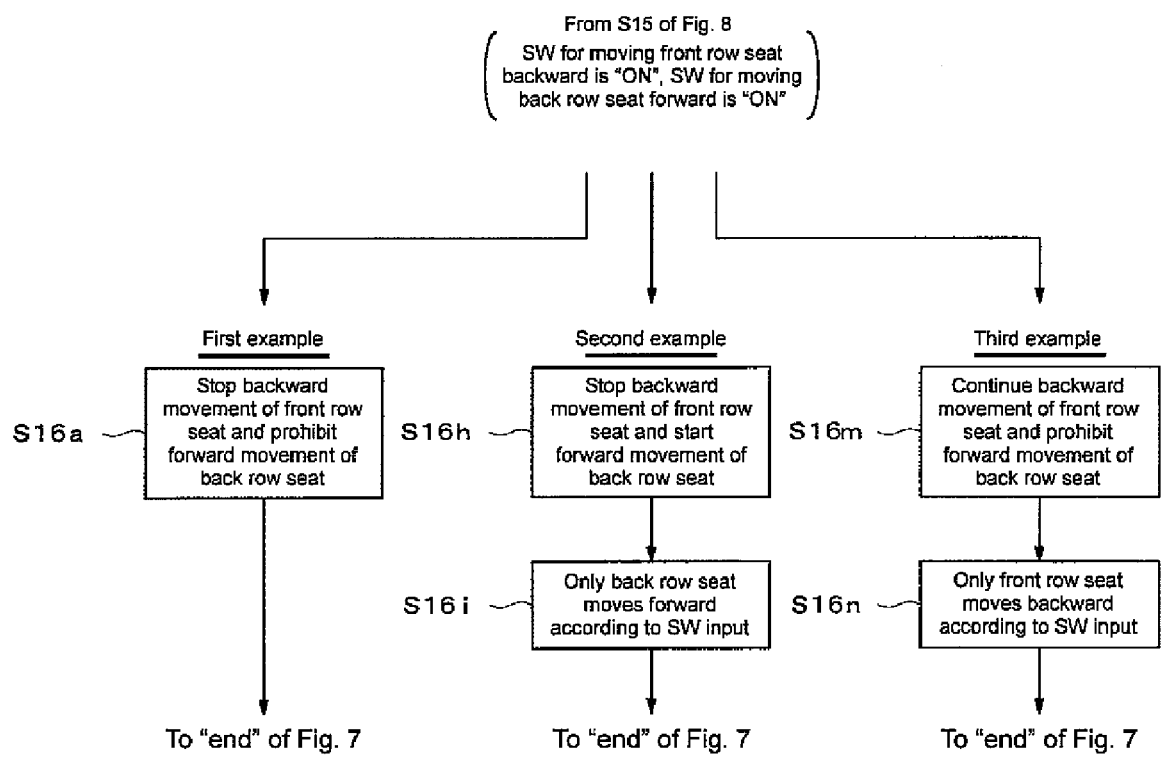
FIG. 13 is a flowchart showing the operation of the seat control device according to an embodiment of the present invention.

The details of the operation of the seat control device 100 according to the first to third examples will be described using the flowchart of FIG. 13. In FIG. 13, step S16a is the first example of the seat control described above performed in step S16 (FIG. 8), steps S16h, S16i are the second example of the seat control described above performed in step S16, and steps S16m, S16n are the third example of the seat control described above performed in step S16.

In step S16a of FIG. 13, the backward movement of the front row seat that started the backward movement operation in step S11 (FIG. 8) is stopped and the forward movement of the back row seat is prohibited.

Specifically, since the front row seat started moving backward, that is, the seat 21a started moving backward in the X2 direction in step S11 according to the verification result of step S10 (FIG. 8), the drive of the drive control unit 14a is stopped, and the backward movement of the seat 21a is stopped under the control of the control unit 11

Furthermore, even if the back row seat attempts to start moving forward, that is, the seat 21c attempts to start moving forward in the X1 direction according to the verification result of step S15, the drive of the drive control unit 14c is prohibited, and the forward movement of the seat 21c is prohibited under the control of the control unit 11.

The seat control for this time is terminated as soon as the backward movement of the front row seat, that is, the seat 21a is stopped, and the forward movement of the back row seat, that is, the seat 21c is prohibited to prepare for the next seat control.

In steps S16h, S16i of FIG. 13, the backward movement of the front row seat that started the backward movement operation in step S11 is stopped. The back row seat starts the forward movement operation, and moves forward based on the output of the switch related to the relevant operation.

Specifically, since the front row seat started moving backward, that is, the seat 21a started moving backward in the X2 direction in step S11 according to the verification result of step S10, the drive of the drive control unit 14a is stopped, and the backward movement of the seat 21a is stopped under the control of the control unit 11 in step S16h.

Furthermore, the back row seat starts the forward movement operation according to the verification result of step S15. The details on the start of the forward movement operation of the back row seat, that is, the start of the forward movement operation in the X1 direction of the seat 21c are similar to step S7 (FIG. 7), and thus the description thereof will not be given.

In step S16i, the back row seat that started the forward movement operation in step S16h moves forward based on the output of the switch related to the relevant operation. The forward movement operation in step S16i of the back row seat, that is, the seat 21c that started the forward movement operation in step S16h is similar to step S8 (FIG. 7), and thus the description thereof will not be given.

The seat control for this time is terminated as soon as the backward movement of the front row seat, that is, the seat 21a is stopped, and the forward movement of the back row seat, that is, the seat 21c is completed to prepare for the next seat control.

In steps S16m, S16n of FIG. 13, the backward movement of the front row seat that started the backward movement operation in step S11 is continued, and the forward movement of the back row seat is prohibited.

Specifically, since the front row seat started moving backward, that is, the seat 21a started moving backward in the X2 direction in step S11 according to the verification result of step S10, the backward movement of the seat is continued in step S16m.

The drive of the drive control unit 14c is prohibited, and the forward movement of the seat 21c is prohibited under the control of the control unit 11 even when the back row seat attempts to start moving forward, that is, the seat 21c attempts to start moving forward in the X1 direction according to the verification result of step S15.

In step S16n, the front row seat that started the backward movement operation in step S11 moves backward based on the output of the switch related to the relevant operation. The backward movement operation in step S16n of the front row seat, that is, the seat 21a that started the backward movement operation in step S11 is similar to step S14 (FIG. 8), and thus the description thereof will not be given. The seat control for this time is terminated as soon as the forward movement of the back row seat, that is, the seat 21c is prohibited, and the backward movement of the front row seat, that is, the seat 21a is completed to prepare for the next seat control.

In step S17 of FIG. 8, only the front row seat, that is, the seat 21a that started the backward movement operation in step S11 moves backward based on the output of the switch related to the relevant operation according to the verification result of steps S1 (FIG. 7), S10, S12, and S15. The backward movement operation in step S17 of the front row seat, that is, the seat 21a that started the backward movement operation in step S11 is similar to step S14, and thus the description thereof will not be given. The seat control for this time is terminated as soon as the backward movement of the seat 21a is completed to prepare for the next seat control.

Figure 9:
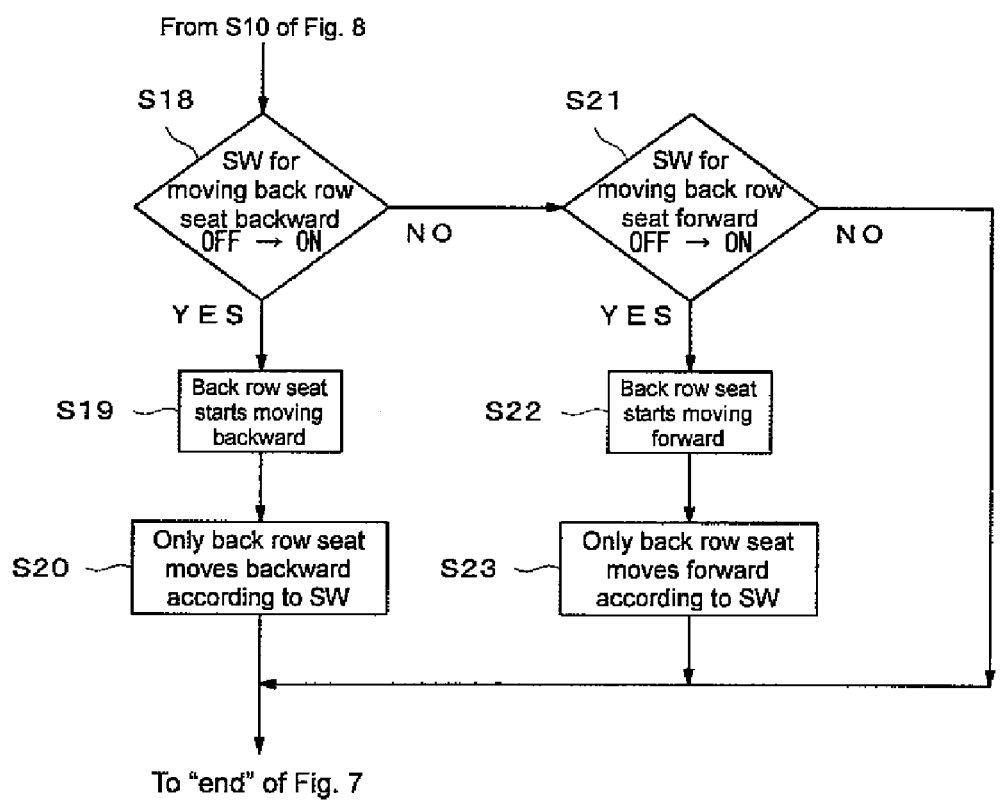
FIG. 9 is a flowchart showing the operation of the seat control device according to an embodiment of the present invention.

In step S18 of FIG. 9, the control unit 11 verifies whether or not the switch for moving the back row seat backward is switched from the "OFF" state to the "ON" state, that is, whether or not the input unit 12c is pushed to the back side by the passenger 22c according to the verification result of step S10 (FIG. 8), where the process proceeds to step S19 if pushed to the back side (step S18: YES), and the process proceeds to after step S21 if not pushed to the back side (step S18: NO).

In step S19, the back row seat starts the backward movement operation according to the verification result of step S18. The details related to the start of the backward movement operation of the back row seat, that is, the start of the backward movement operation in the X2 direction of the seat 21c are similar to step S4 (FIG. 7), and thus the description thereof will not be given.

In step S20, only the back row seat, that is, the seat 21c that started the backward movement operation in step S19 moves backward based on the output of the switch related to the relevant operation according to the verification results of the steps S1, S10, and S18. The backward movement operation in step S20 of the back row seat, that is, the seat 21c that started the backward movement operation in step S19 is similar to step S5 (FIG. 7), and thus the description thereof will not be given. The seat control for this time is terminated as soon as the backward movement of the back row seat, that is, the seat 21c is completed to prepare for the next seat control.

In step S21, the control unit 11 verifies whether or not the switch for moving the back row seat forward is switched from the "OFF" state to the "ON" state, that is, whether or not the input unit 12c is pushed to the front side by the passenger 22c according to the verification result of step S18, where the process proceeds to step S22 if pushed to the front side (step S21: YES), and the flowchart is terminated according to the verification results of steps S1, S10, S18, and S21 if not pushed to the front side (step S21: NO).

In step S22, the back row seat starts the forward movement operation according to the verification result of step S21. The details on the start of the forward movement operation of the back row seat, that is, the start of the forward movement operation in the X1 direction of the seat 21c is similar to step S7 (FIG. 7), and thus the description thereof will not be given.

In step S23, only the back row seat, that is, the seat 21c that started the forward movement operation in step S22 moves forward based on the output of the switch related to the relevant operation according to the verification result of the steps S1, S10, S18, and S21. The forward movement operation in step S23 of the back row seat, that is, the seat 21c that started the forward movement operation in step S22 is similar to step S8 (FIG. 7), and thus the description thereof will not be given. The seat control for this time is terminated as soon as the forward movement of the back row seat, that is, the seat 21c is completed to prepare for the next seat control.

(2) When Back Seat Control Operation is Before, and Front Seat Control Operation is after Now, the operation of the seat control device 100 when the operation for moving the seat 21c in the X1 or the X2 direction is performed at the input unit 12c before, and the operation for moving the seat 21a in the X1 or the X2 direction is performed at the input unit 12a after will be specifically described using the flowcharts of FIGS. 10 to 12, and 14.

Figure 10:
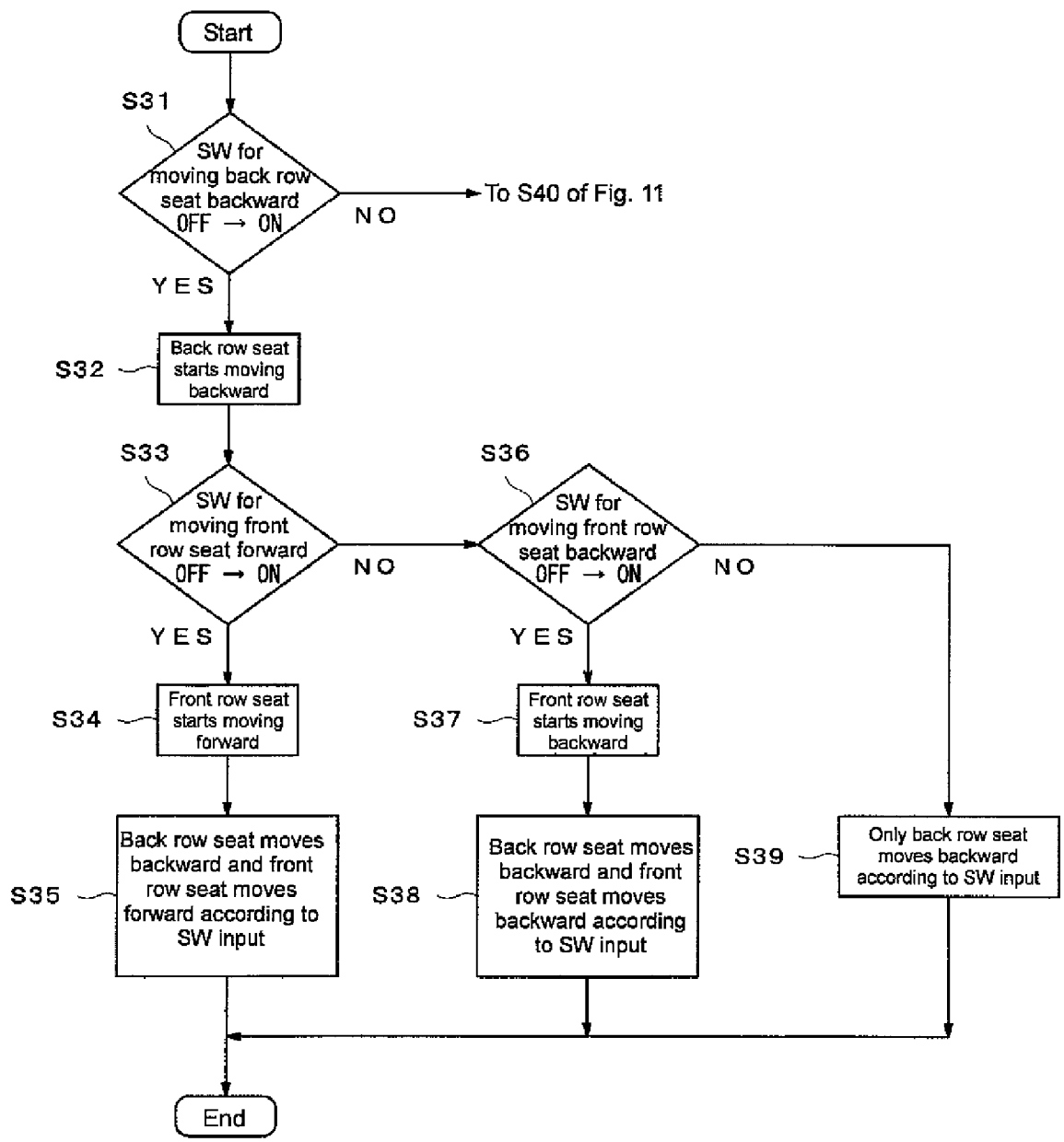
FIG. 10 is a flowchart showing the operation of the seat control device according to an embodiment of the present invention.

In step S31 of FIG. 10, the control unit 11 verifies whether or not the switch for moving the back row seat backward is switched from the "OFF" state to the "ON" state, that is, whether or not the input unit 12c is pushed to the back side by the passenger 22c seated on the seat 21c, where the process proceeds to step S32 if pushed to the back side (step S31: YES), and the process proceeds to after step S40 of FIG. 11 if not pushed to the back side (step S31: NO).

In step S32, the back row seat starts the backward movement operation according to the verification result of step S31. Specifically, since the input unit 12c is pushed to the back side by the passenger 22c, the drive control unit 14c starts the drive to move the seat 21c backward under the control of the control unit 11. The seat 21c then starts the backward movement operation in the X2 direction.

In step S33, the control unit 11 verifies whether or not the switch for moving the front row seat forward is switched from the "OFF" state to the "ON" state, that is, whether or not the input unit 12a is pushed to the front side by the passenger 22a seated on the seat 21a, where the process proceeds to step S34 if pushed to the front side (step S33: YES), and the process proceeds to after step S36 if not pushed to the front side (step S33: NO).

In step S34, the front row seat starts the forward movement operation according to the verification result of step S33. Specifically, since the input unit 12a is pushed to the front side by the passenger 22a, the drive control unit 14a starts the drive to move the seat 21a forward under the control of the control unit 11. The seat 21a then starts the forward movement operation in the X1 direction.

In step S35, the back row seat that started the backward movement operation in step S32 moves backward based on the output of the switch related to the relevant operation, and the front row seat that started the forward movement operation in step S34 moves forward based on the output of the switch related to the relevant operation.

Specifically, if the time the passenger 22c pushed the input unit 12c in step S31 is within the predetermined time t, mentioned above, the seat 21c moves backward in the X2 direction by a predetermined distance based on the pushing time, that is, the output of the input unit 12c within the predetermined range Mc. If the time the passenger 22c pushed the input unit 12c exceeds the predetermined time, the seat 21c automatically moves backward up to the back end position Bc within the predetermined range Mc.

Similar to above, if the time the passenger 22a pushed the input unit 12a in step S33 is within the predetermined time t, mentioned above, the seat 21a moves forward in the X1 direction by a predetermined distance based on the pushing time, that is, the output of the input unit 12a within the predetermined range Ma. If the time the passenger 22a pushed the input unit 12a exceeds the predetermined time, the seat 21a automatically moves forward up to the front end position Fa within the predetermined range Ma. The seat control for this time is terminated as soon as the movement of the front row seat and the back row seat, that is, the seats 21a, 21c is completed to prepare for the next seat control.

In step S36, the control unit 11 verifies whether or not the switch for moving the front row seat backward is switched from the "OFF" state to the "ON" state, that is, whether or not the input unit 12a is pushed to the back side by the passenger 22a according to the verification result of step S33, where the process proceeds to step S37 if pushed to the back side (step S36: YES), and the process proceeds to step S39 if not pushed to the back side (step S36: NO).

In step S37, the front row seat starts the backward movement operation according to the verification result of step S36. Specifically, since the input unit 12a is pushed to the back side by the passenger 22a, the drive control unit 14a starts the drive to move the seat 21a backward under the control of the control unit 11. The seat 21a then starts the backward movement operation in the X2 direction.

In step S38, the back row seat that started the backward movement operation in step S32 moves backward based on the output of the switch related to the relevant operation, and the front row seat that started the backward movement operation in step S37 moves backward based on the output of the switch related to the relevant operation.

Specifically, if the time the passenger 22a pushed the input unit 12a in step S36 is within the predetermined time t, the seat 21a moves backward in the X2 direction by a predetermined distance based on the pushing time, that is, the output of the input unit 12a within the predetermined range Ma. If the time the passenger 22a pushed the input unit 12a exceeds the predetermined time, the seat 21a automatically moves backward up to the back end position Ba within the predetermined range Ma. The back row seat that started the backward movement operation in step S32, that is, the backward movement operation in step S38 of the seat 21c is similar to step S35, and thus the description thereof will not be given. The seat control for this time is terminated as soon as the movement of the front row seat and the back row seat, that is, the seats 21a, 21c is completed to prepare for the next seat control.

In step S39, only the back row seat, that is, the seat 21c that started the backward movement operation in step S32 moves backward based on the output of the switch related to the relevant operation according to the verification results of steps S31, S33, and S36. The backward movement operation in step S39 of the seat 21c is similar to step S35, and thus the description thereof will not be given. The seat control for this time is terminated as soon as the movement of the back row seat, that is, the seat 21c is completed to prepare for the next seat control.

Figure 11:
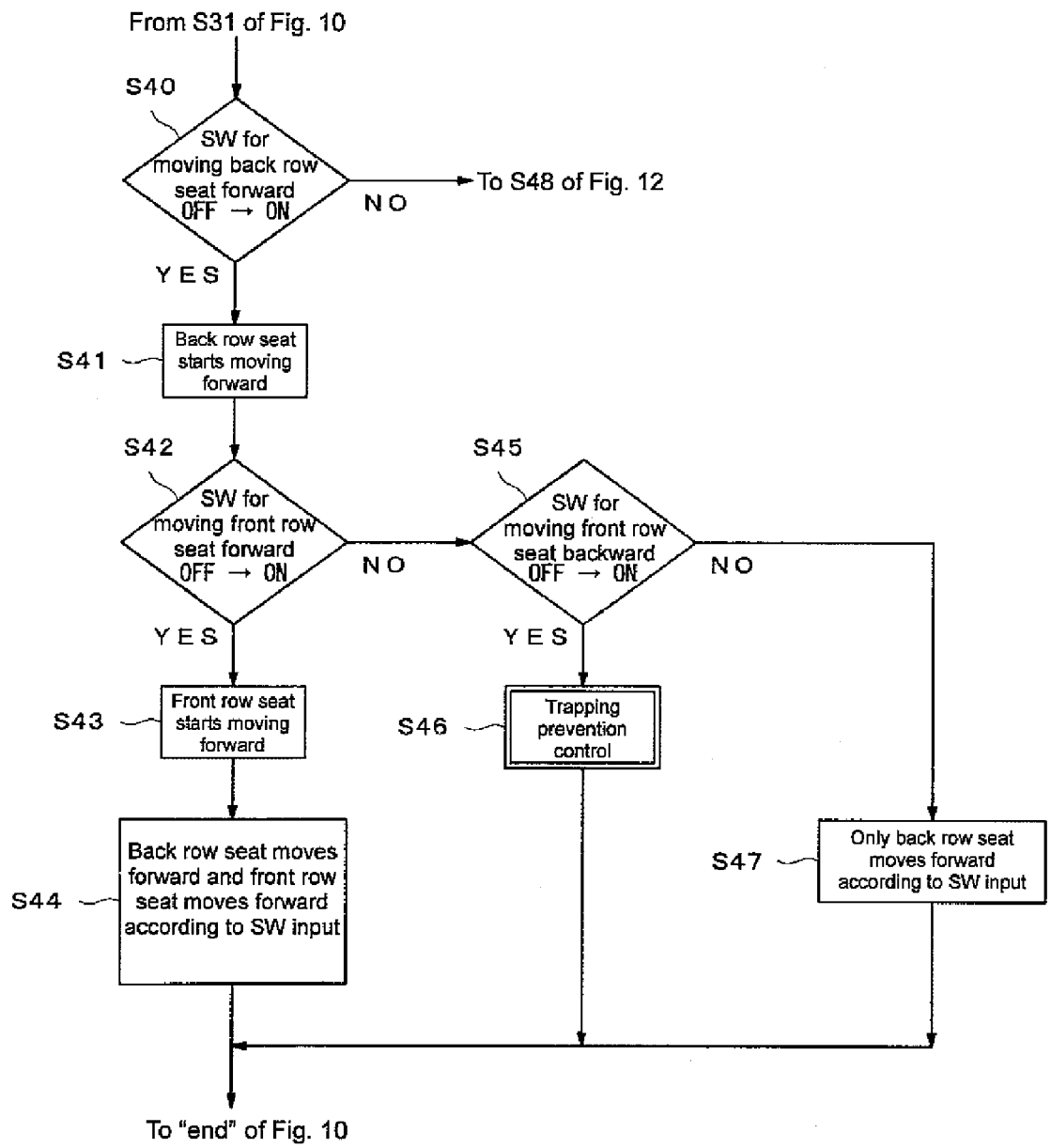
FIG. 11 is a flowchart showing the operation of the seat control device according to an embodiment of the present invention.

In step S40 of FIG. 11, the control unit 11 verifies whether or not the switch for moving the back row seat forward is switched from the "OFF" state to the "ON" state, that is, whether or not the input unit 12c is pushed to the front side by the passenger 22c according to the verification result of step S31 (FIG. 10), where the process proceeds to step S41 if pushed to the front side (step S40: YES), and the process proceeds to after step S48 of FIG. 12 if not pushed to the front side (step S40: NO).

In step S41, the back row seat starts the forward movement operation according to the verification result of step S40. Specifically, since the input unit 12c is pushed to the front side by the passenger 22c, the drive control unit 14c starts the drive to move the seat 21c forward under the control of the control unit 11. The seat 21c then starts the forward movement operation in the X1 direction.

In step S42, the control unit 11 verifies whether or not the switch for moving the front row seat forward is switched from the "OFF" state to the "ON" state, that is, whether or not the input unit 12a is pushed to the front side by the passenger 22a, where the process proceeds to step S43 if pushed to the front side (step S42: YES), and the process proceeds to after step S45 if not pushed to the front side (step S42; NO).

In step S43, the front row seat starts the forward movement operation according to the verification result of step S42. The details related to the start of the forward movement operation of the front row seat, that is, the start of the forward movement operation in the X1 direction of the seat 21a are similar to step S34 (FIG. 10), and thus the description thereof will not be given.

In step S44, the back row seat that started the forward movement operation in step S41 moves forward based on the output of the switch related to the relevant operation, and the front row seat that started the forward movement operation in step S43 moves forward based on the output of the switch related to the relevant operation.

Specifically, if the time the passenger 22c pushed the input unit 12c in step S40 is within the predetermined time t, the seat 21c moves forward in the X1 direction by a predetermined distance based on the pushing time, that is, the output of the input unit 12c within the predetermined range Mc. If the time the passenger 22c pushed the input unit 12c exceeds the predetermined time, the seat 21c automatically moves forward up to the front end position Fc within the predetermined range Mc. The front row seat that started the forward movement operation in step S43, that is, the forward movement operation in step S44 of the seat 21a is similar to step S35 (FIG. 10), and thus the description thereof will not be given. The seat control for this time is terminated as soon as the movement of the front row seat and the back row seat, that is, the seats 21a, 21c is completed to prepare for the next seat control.

In step S45, the control unit 11 verifies whether or not the switch for moving the front row seat backward is switched from the "OFF" state to the "ON" state, that is, whether or not the input unit 12a is pushed to the back side by the passenger 22a according to the verification result of step S42, where the process proceeds to step S46 if pushed to the back side (step S45: YES), and the process proceeds to step S47 if not pushed to the back side (step S45: NO).

If the determination of step S45 is YES, the backward movement of the front row seat is started, under normal circumstances, during the forward movement of the back row seat according to the verification results of steps S31 (FIG. 10), S40, S42, and S45.

When the back row seat moves forward and the front row seat moves backward, the seats approach each other as in FIG. 6, and an object between the front row seat and the back row seat such as the foot (shaded portion in FIG. 6) of the passenger 22c seated on the seat 21c may get trapped from two directions (X1 direction and X2 direction) by the seats 21a, 21c depending on the movement amount of each seat.

In the seat control device 100 according to an embodiment of the present invention, the seat control for preventing such trapping, that Is, the seat control similar to the step S16 (FIG. 8) described above is performed in step S46.

Specifically, in a first example of the present embodiment, the movement of the seat based on the output of the input unit operated before is stopped, and the movement of the seat based on the output of the input unit operated after is prohibited. In other words, the forward movement of the seat 21c based on the output of the input unit 12c is stopped and the backward movement of the seat 21a based on the output of the input unit 12a is prohibited in step S46.

In a second example of the present embodiment, the movement of the seat based on the output of the input unit operated before is stopped, and the movement of the seat based on the output of the input unit operated after is executed. In other words, the forward movement of the seat 21c based on the output of the input unit 12c is stopped and the backward movement of the seat 21a based on the output of the input unit 12a is executed in step S46.

In a third example of the present embodiment, the movement of the seat based on the output of the input unit operated before is executed, and the movement of the seat based on the output of the input unit operated after is prohibited. In other words, the forward movement of the seat 21c based on the output of the input unit 12c is executed and the backward movement of the seat 21a based on the output of the input unit 12a is prohibited in step S46.

Figure 14:
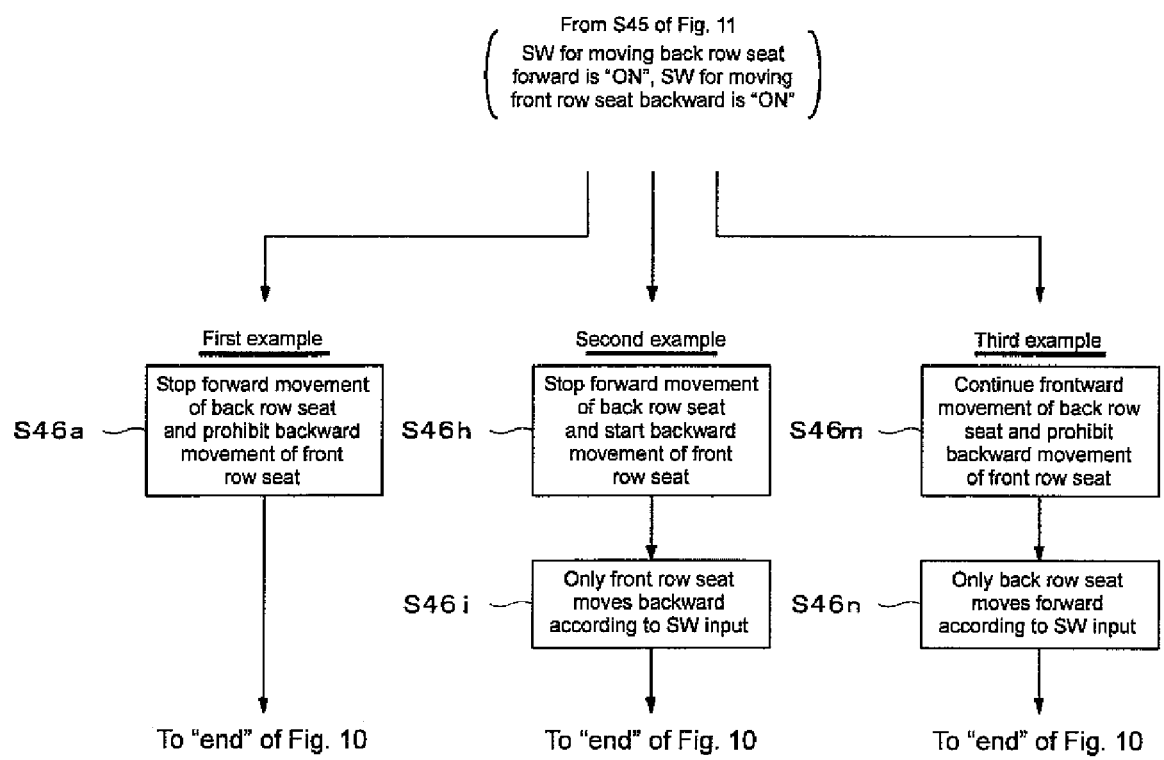
FIG. 14 is a flowchart showing the operation of the seat control device according to an embodiment of the present invention.

The details of the operation of the seat control device 100 according to the first to third examples will be described using the flowchart of FIG. 14. In FIG. 14, step S46a is the first example of the seat control described above performed in step S46 (FIG. 11), steps S46h, S46i are the second example of the seat control described above performed in step S46, and steps S46m, S46n are the third example of the seat control described above performed in step S46.

In step S46a of FIG. 14, the forward movement of the back row seat that started the forward movement operation in step S41 (FIG. 11) is stopped and the backward movement of the front row seat is prohibited.

Specifically, since the back row seat started moving forward, that is, the seat 21c started moving forward in the X1 direction in step S41 according to the verification result of step S40 (FIG. 11), the drive of the drive control unit 14c is stopped, and the forward movement of the seat 21c is stopped under the control of the control unit 11.

Furthermore, even if the front row seat attempts to start moving backward, that is, the seat 21a attempts to start moving backward in the X2 direction according to the verification result of step S45, the drive of the drive control unit 14a is prohibited, and the backward movement of the seat 21a is prohibited under the control of the control unit 11. The seat control for this time is terminated as soon as the forward movement of the back row seat, that is, the seat 21c is stopped, and the backward movement of the front row seat, that is, the seat 21a is prohibited to prepare for the next seat control.

In steps S46h, S46i of FIG. 14, the forward movement of the back row seat that started the forward movement operation in step S41 is stopped. The front row seat starts the backward movement operation, and moves backward based on the output of the switch related to the relevant operation.

Specifically, since the back row seat started moving forward, that is, the seat 21c started moving forward in the X1 direction in step S41 according to the verification result of step S40, the drive of the drive control unit 14c is stopped and the forward movement of the seat 21c is stopped under the control of the control unit 11 in step S46h.

Furthermore, the front row seat starts the backward movement operation according to the verification result of step S45. The details on the start of the backward movement operation of the front row seat, that is, the start of the backward movement operation in the X2 direction of the seat 21a are similar to step S37 (FIG. 10), and thus the description thereof will not be given.

In step S46i, the front row seat that started the backward movement operation in step S46h moves backward based on the output of the switch related to the relevant operation. The backward movement operation in step S46i of the front row seat, that is, the seat 21a that started the backward movement operation in step S46h is similar to step S38 (FIG. 10), and thus the description thereof will not be given.

The seat control for this time is terminated as soon as the forward movement of the back row seat, that is, the seat 21c is stopped, and the backward movement of the front row seat, that is, the seat 21a is completed to prepare for the next seat control.

In steps S46m, S46n of FIG. 14, the forward movement of the back row seat that started the forward movement operation in step S41 is continued, and the backward movement of the front row seat is prohibited.

Specifically, since the back row seat started moving forward, that is, the seat 21c started moving forward in the X1 direction in step S41 according to the verification result of step S40, the forward movement of the seat is continued in step S46m.

The drive of the drive control unit 14a is prohibited, and the backward movement of the seat 21a is prohibited under the control of the control unit 11 even when the front row seat attempts to start moving backward, that is, the seat 21a attempts to start moving backward in the X2 direction according to the verification result of step S45.

In step S46n, the back row seat that started the forward movement operation in step S41 moves forward based on the output of the switch related to the relevant operation. The forward movement operation in step S46n of the back row seat, that is, the seat 21c that started the forward movement operation in step S41 is similar to step S44 (FIG. 11), and thus the description thereof will not be given. The seat control for this time is terminated as soon as the backward movement of the front row seat, that is, the seat 21a is prohibited, and the forward movement of the back row seat, that is, the seat 21c is completed to prepare for the next seat control.

In step S47 of FIG. 11, only the back row seat, that is, the seat 21c that started the forward movement operation in step S41 moves forward based on the output of the switch related to the relevant operation according to the verification result of steps S31 (FIG. 10), S40, S42, and S45. The forward movement operation in step S47 of the back row seat, that is, the seat 21c that started the forward movement operation in step S41 is similar to step S44, and thus the description thereof will not be given. The seat control for this time is terminated as soon as the forward movement of the seat 21c is completed to prepare for the next seat control.

Figure 12:
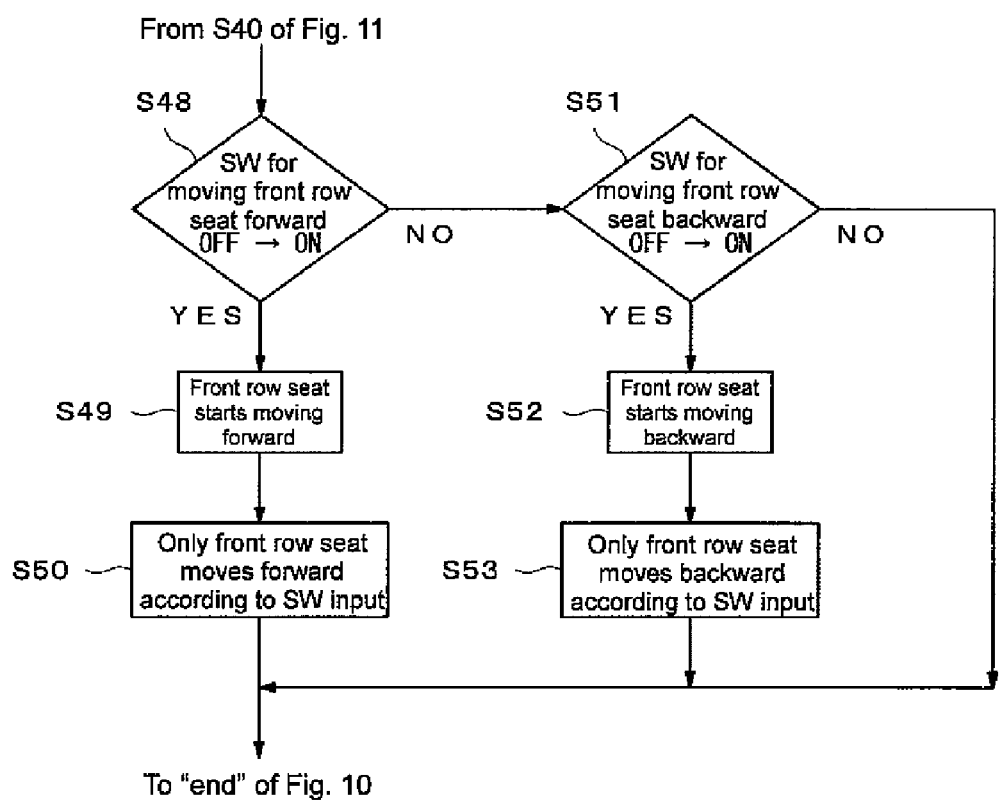
FIG. 12 is a flowchart showing the operation of the seat control device according to an embodiment of the present invention.

In step S48 of FIG. 12, the control unit 11 verifies whether or not the switch for moving the front row seat forward is switched from the "OFF" state to the "ON" state, that is, whether or not the input unit 12a is pushed to the front side by the passenger 22a according to the verification result of step S40 (FIG. 11), where the process proceeds to step S49 if pushed to the front side (step S48; YES), and the process proceeds to after step S51 if not pushed to the front side (step S48: NO).

In step S49, the front row seat starts the forward movement operation according to the verification result of step S48. The details related to the start of the forward movement operation of the front row seat, that is, the start of the forward movement operation in the X1 direction of the seat 21a are similar to step S34 (FIG. 10), and thus the description thereof will not be given.

In step S50, only the front row seat, that is, the seat 21a that started the forward movement operation in step S49 moves forward based on the output of the switch related to the relevant operation according to the verification results of the steps S31, S40, and S48. The forward movement operation in step S50 of the front row seat, that is, the seat 21a that started the forward movement operation in step S49 is similar to step S35 (FIG. 10), and thus the description thereof will not be given. The seat control for this time is terminated as soon as the forward movement of the front row seat, that is, the seat 21a is completed to prepare for the next seat control.

In step S51, the control unit 11 verifies whether or not the switch for moving the front row seat backward is switched from the "OFF" state to the "ON" state, that is, whether or not the input unit 12a is pushed to the back side by the passenger 22a according to the verification result of step S48, where the process proceeds to step S52 if pushed to the back side (step S51: YES), and the flowchart is terminated according to the verification results of steps S31, S40, S48, and S51 if not pushed to the back side (step S51: NO).

In step S52, the front row seat starts the backward movement operation according to the verification result of step S51. The details on the start of the backward movement operation of the front row seat, that is, the start of the backward movement operation in the X2 direction of the seat 21a is similar to step S37 (FIG. 10), and thus the description thereof will not be given.

In step S53, only the front row seat, that is, the seat 21a that started the backward movement operation in step S52 moves backward based on the output of the switch related to the relevant operation according to the verification result of the steps S31, S40, S48, and S51. The backward movement operation in step S53 of the front row seat, that is, the seat 21a that started the backward movement operation in step S52 is similar to step S38 (FIG. 10), and thus the description thereof will not be given. The seat control for this time is terminated as soon as the backward movement of the front row seat, that is, the seat 21a is completed to prepare for the next seat control.

Therefore, in the first example of the present embodiment, if the input unit operated before is the input unit 12a and the input unit operated after is the input unit 12c, the backward movement of the seat 21a based on the output of the input unit 12a is stopped and the forward movement of the seat 21c based on the output of the input unit 12c is prohibited in step S16 (FIG. 8). If the input unit operated before is the input unit 12c and the input unit operated after is the input unit 12a, the forward movement of the seat 21c based on the output of the input unit 12c is stopped and the backward movement of the seat 21a based on the output of the input unit 12a is prohibited in step S46 (FIG. 11). Accordingly, since the movement of either the seat 21a or the seat 21c, which are in front and back relationship to each other, is stopped and the movement of the other seat is prohibited, the seats are avoided from approaching each other, and thus the trapping of the object between the seat 21a and the seat 21c can be inhibited.

In the second example of the present embodiment, if the input unit operated before is the input unit 12a and the input unit operated after is the input unit 12c, the backward movement of the seat 21a based on the output of the input unit 12a is stopped and the forward movement of the seat 21c based on the output of the input unit 12c is executed in step S16. If the input unit operated before is the input unit 12c and the input unit operated after is the input unit 12a, the forward movement of the seat 21c based on the output of the input unit 12c is stopped and the backward movement of the seat 21a based on the output of the input unit 12a is executed in step S46. Accordingly, even if either the seat 21a or the seat 21c, which are in front and back relationship to each other, moves, the movement of the other seat is stopped, and thus the seats are avoided from approaching each other, and the object between the seat 21a and the seat 21c can be inhibited from being trapped from two directions by the seats 21a, 21c.

In the third example of the present embodiment, if the input unit operated before is the input unit 12a and the input unit operated after is the input unit 12c, the backward movement of the seat 21a based on the output of the input unit 12a is executed and the forward movement of the seat 21c based on the output of the input unit 12c is prohibited in step S16. If the input unit operated before is the input unit 12c and the input unit operated after is the input unit 12a, the forward movement of the seat 21c based on the output of the input unit 12c is executed and the backward movement of the seat 21a based on the output of the input unit 12a is prohibited in step S46. Accordingly, even if either the seat 21a or the seat 21c, which are in front and back relationship to each other, moves, the movement of the other seat is prohibited, and thus the seats are avoided from approaching each other, and the object between the seat 21a and the seat 21c can be inhibited from being trapped from two directions by the seats 21a, 21c.

Figure 15:
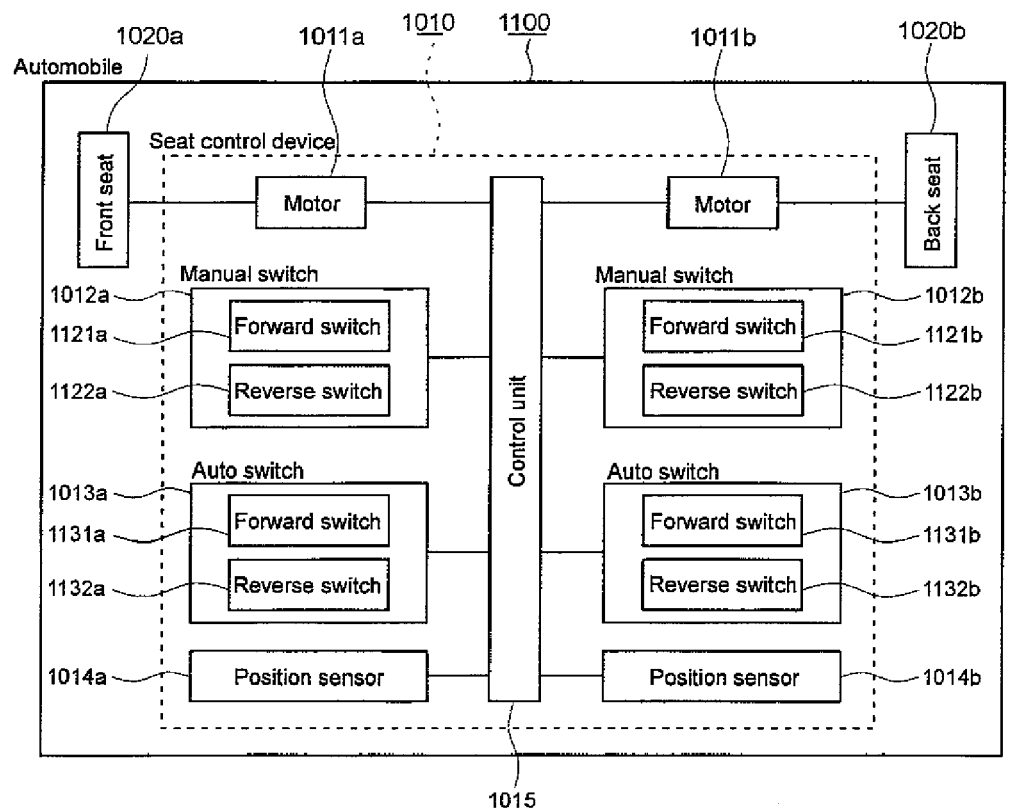
FIG. 15 is a block diagram showing a configuration of an automobile arranged with the seat control device according to a first embodiment of the present invention.
Figure 16:
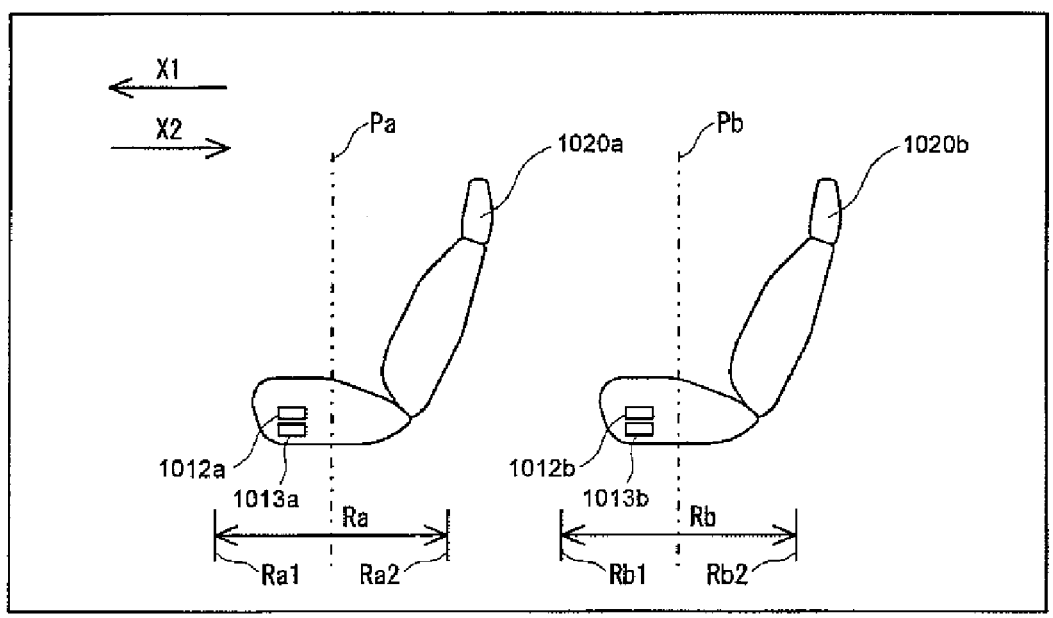
FIG. 16 is a schematic view showing the front seat and the back seat arranged in the automobile of FIG. 15.

FIG. 15 is a block diagram showing a configuration of an automobile arranged with the seat control device according to the first embodiment of the present invention. FIG. 16 is a schematic view showing the front seat and the back seat arranged in the automobile of FIG. 15. First, the configuration of the automobile 1100 arranged with the seat control device 1010 according to the first embodiment of the present invention will be described with reference to FIGS. 15 and 16. The configuration of FIGS. 15 and 16 are the same in the second to the seventh embodiments hereinafter described.

As shown in FIG. 15, the automobile 1100 includes a seat control device 1010, and a front seat 1020a and a back seat 1020b. In other words, the automobile 1100 has two rows of seats (front seat 1020a and back seat 1020b), as shown in FIG. 16.

The seat control device 1010 according to the first embodiment is arranged to adjust the horizontal position of the front seat 1020a and the back seat 1020b by moving the front seat 1020a and the back seat 1020b forward or backward. Specifically, the seat control device 1010 is arranged to move the front seat 1020a forward (movement in the X1 direction) or backward (movement in the X2 direction) within a predetermined range Ra with respect to a reference position Pa. The seat control device 1010 is also arranged to move the back seat 1020b forward or backward within a predetermined range Rb with respect to a reference position Pb.

As shown in FIG. 15, the seat control device 1010 includes a motor 1011a for the front seat 1020a, a manual switch 1012a, an auto switch 1013a, and a position sensor 1014a. The manual switch 1012a and the auto switch 1013a are arranged at the front seat 1020a, as shown in FIG. 16. The motor 1011a serves as the "first drive unit" according to one or more embodiments of the present invention. The manual switch 1012a serves as the "first manual switch" according to one or more embodiments of the present invention. The auto switch 1013a serves as the "first auto switch" according to one or more embodiments of the present invention.

As shown in FIG. 15, the motor 1011a is arranged to move the front seat 1020a forward or backward according to the operation state of the manual switch 1012a and the auto switch 1013a.

The manual switch 1012a is arranged to move the front seat 1020a forward or backward while being operated by a user. Specifically, the manual switch 1012a includes a forward switch 1121a and a reverse switch 1122a. The manual switch 1012a is configured to move the front seat 1020a forward by the motor 1011a while the forward switch 1121a is being pushed (while the forward switch 1121a is in ON state). The manual switch 1012a is also configured to move the front seat 1020a backward by the motor 1011a while the reverse switch 1122a is being pushed (while the reverse switch 1122a is in ON state).

The auto switch 1013a is arranged to move the front seat 1020a forward or backward after being operated by the user. Specifically, the auto switch 1013a includes a forward switch 1131a and a reverse switch 1132a. The auto switch 1013a is configured to move the front seat 1020a forward up to the front end Ra1 (see FIG. 16) of the predetermined range Ra by the motor 1011a when the forward switch 1131a is once pushed (forward switch 1131a is turned ON) even after the operation is canceled. The auto switch 1013a is also configured to move the front seat 1020a backward up to the back end Ra2 (see FIG. 16) of the predetermined range Ra by the motor 1011a when the reverse switch 1132a is once pushed (reverse switch 1132a is turned ON) even after the operation is canceled.

The position sensor 1014a is arranged to detect the position of the front seat 1020a within the predetermined range Ra (see FIG. 16).

The seat control device 1010 also includes a motor 1011b for the back seat 1020b, a manual switch 1012b, an auto switch 1013b, and a position sensor 1014b. The manual switch 1012b and the auto switch 1013b are arranged at the back seat 1020b, as shown in FIG. 16. The motor 1011b serves as the "second drive unit" according to one or more embodiments of the present invention. The manual switch 1012b serves as the "second manual switch" according to one or more embodiments of the present invention. The auto switch 1013b serves as the "second auto switch" according to one or more embodiments of the present invention.

As shown in FIG. 15, the motor 1011b is arranged to move the back seat 1020b forward or backward according to the operation state of the manual switch 1012b and the auto switch 1013b.

The manual switch 1012b is arranged to move the back seat 1020b forward or backward while being operated by the user. Specifically, the manual switch 1012b includes a forward switch 1121b and a reverse switch 1122b. The manual switch 1012b is configured to move the back seat 1020b forward by the motor 1011b while the forward switch 1121b is being pushed (while the forward switch 1121b is in ON state). The manual switch 1012b is also configured to move the back seat 1020b backward by the motor 1011b while the reverse switch 1122b is being pushed (while the reverse switch 1122b is in ON state).

The auto switch 1013b is arranged to move the back seat 1020b forward or backward after being operated by the user. Specifically, the auto switch 1013b includes a forward switch 1131b and a reverse switch 1132b. The auto switch 1013b is configured to move the back seat 1020b forward up to the front end Rb1 (see FIG. 16) of the predetermined range Rb by the motor 1011b when the forward switch 1131b is once pushed (forward switch 1131b is turned ON) even after the operation is canceled. The auto switch 1013b is also configured to move the back seat 1020b backward up to the back end Rb2 (see FIG. 16) of the predetermined range Rb by the motor 1011b when the reverse switch 1132b is once pushed (reverse switch 1132b is turned ON) even after the operation is canceled.

The position sensor 1014b is arranged to detect the position of the back seat 1020b within the predetermined range Rb (see FIG. 16).

The seat control device 1010 includes a control unit 1015 configured by a CPU, an ROM, an RAM, and the like. The control unit 1015 is configured to drive the motors 1011a and 1011b based on the operation states of the manual switches 1012a, 1012b, and the auto switches 1013a, 1013b by the user.

The control unit 1015 is configured to stop driving the motor 1011a when the position sensor 1014a detects that the front seat 1020a reached the front end Ra1 (see FIG. 16) of the predetermined range Ra during the forward movement operation of the front seat 1020a. The control unit 1015 is also configured to stop driving the motor 1011a when the position sensor 1014a detects that the front seat 1020a reached the back end Ra2 (see FIG. 16) of the predetermined range Ra during the backward movement operation of the front seat 1020a.

The control unit 1015 is configured to stop driving the motor 1011b when the position sensor 1014b detects that the back seat 1020b reached the front end Rb1 (see FIG. 16) of the predetermined range Rb during the forward movement operation of the back seat 1020b. The control unit 1015 is also configured to stop driving the motor 1011b when the position sensor 1014b detects that the back seat 1020b reached the back end Rb2 (see FIG. 16) of the predetermined range Rb during the backward movement operation of the back seat 1020b.

In the first embodiment, the seat control device 1010 is configured to prohibit the backward movement operation of the front seat 1020a and the forward movement operation of the back seat 1020b when the reverse switch 1132a of the auto switch 1013a for the front seat 1020a and the forward switch 1131b of the auto switch 1013b for the back seat 1020b are simultaneously pushed. Specifically, the seat control device 1010 is configured such that the control unit 1015 does not drive the motors 1011a and 1011b when the reverse switch 1132a and the forward switch 1131b are simultaneously turned ON. A case where the reverse switch 1132a and the forward switch 1131b are simultaneously pushed includes a case where the forward switch 1131b is pushed before the front seat 1020a starts the backward movement operation after the reverse switch 1132a is pushed, and a case where the reverse switch 1132a is pushed before the back seat 1020b starts the forward movement operation after the forward switch 1131b is pushed.

In the first embodiment, the seat control device 1010 is configured to cancel the backward movement operation of the front seat 1020a and to prohibit the forward movement operation of the back seat 1020b when the forward switch 1131b of the auto switch 1013b for the back seat 1020b is pushed during the backward movement operation of the front seat 1020a by the reverse switch 1132a of the auto switch 1013a. Specifically, the seat control device 1010 is configured such that the control unit 1015 stops driving the motor 1011a and does not drive the motor 1011b when the forward switch 1131b is turned ON during the backward movement operation of the front seat 1020a by the reverse switch 1132a.

Furthermore, in the first embodiment, the seat control device 1010 is configured to cancel the forward movement operation of the back seat 1020b and to prohibit the backward movement operation of the front seat 1020a when the reverse switch 1132a of the auto switch 1013a for the front seat 1020a is pushed during the forward movement operation of the back seat 1020b by the forward switch 1131b of the auto switch 1013b. Specifically, the seat control device 1010 is configured such that the control unit 1015 stops driving the motor 1011b and does not drive the motor 1011a when the reverse switch 1132a is turned ON during the forward movement operation of the back seat 1020b by the forward switch 1131b.

As shown in FIG. 16, the front seat 1020a is arranged in a region corresponding to the back seat 1020b in front of the back seat 1020b. The front seat 1020a may be a driver's seat or may be a front passenger's seat.

Figure 17:
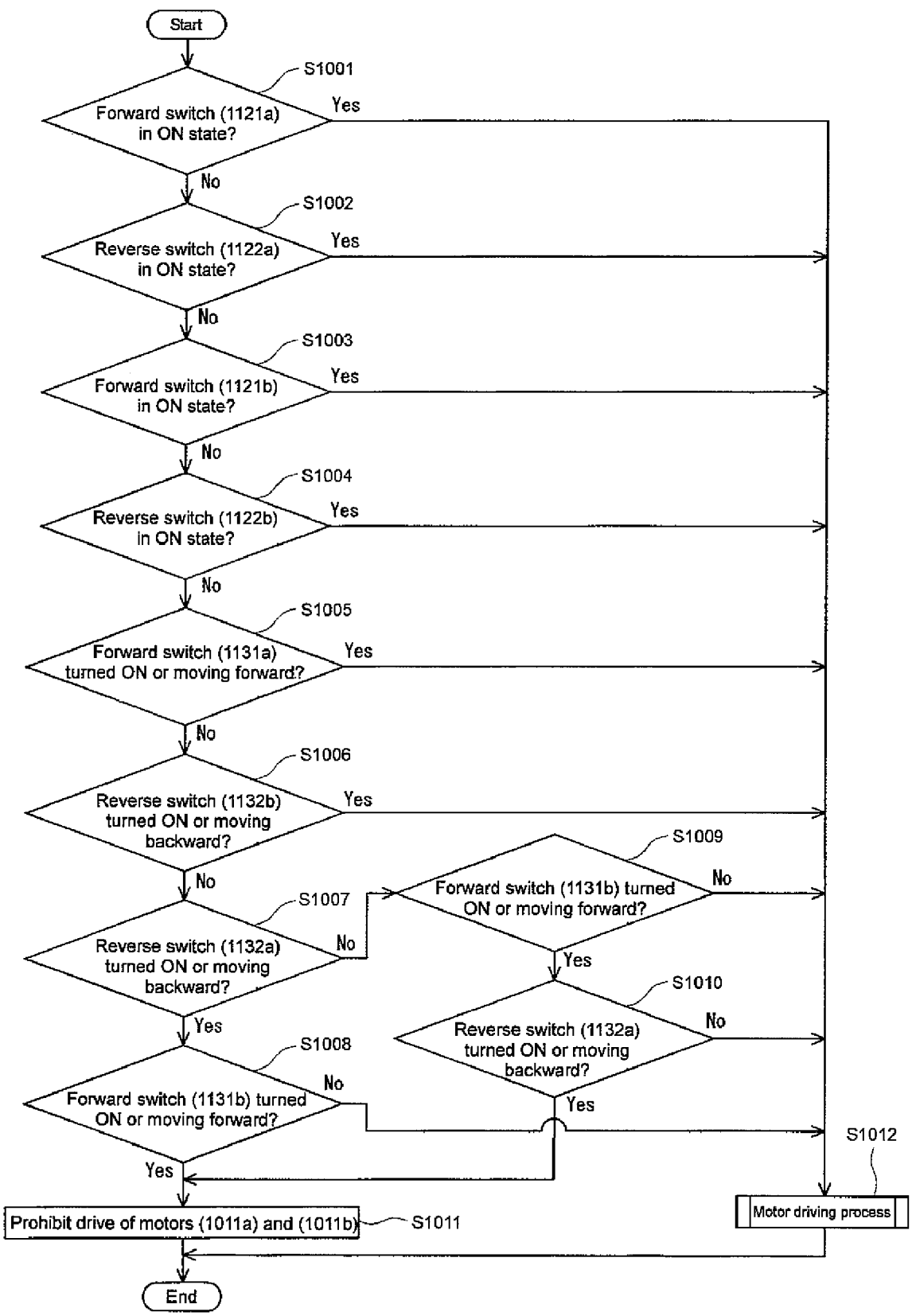
FIG. 17 is a flowchart for describing the operation of the seat control device according to the first embodiment of the present invention.

FIG. 17 is a flowchart for describing the operation of the seat control device according to the first embodiment of the present invention. The operation of the seat control device 1010 according to the first embodiment will be described with reference to FIGS. 15 to 17. The following operations are repeatedly performed in the seat control device 1010.

First, in the seat control device 1010 (see FIG. 15), the control unit 1015 (see FIG. 15) determines whether or not the forward switch 1121a (see FIG. 15) of the manual switch 1012a for the front seat 1020a is in the ON state in step S1001 of FIG. 17. The process proceeds to step S1002 if determined by the control unit 1015 that the forward switch 1121a is not in the ON state. The process proceeds to step S1012 if determined by the control unit 1015 that the forward switch 1121a is in the ON state.

In step S1002, the control unit 1015 determines whether or not the reverse switch 1122a (see FIG. 15) of the manual switch 1012a for the front seat 1020a is in the ON state. The process proceeds to step S1003 if determined by the control unit 1015 that the reverse switch 1122a is not in the ON state. The process proceeds to step S1012 if determined by the control unit 1015 that the reverse switch 1122a is in the ON state.

In step S1003, the control unit 1015 determines whether or not the forward switch 1121b (see FIG. 15) of the manual switch 1012b for the back seat 1020b is in the ON state. The process proceeds to step S1004 if determined by the control unit 1015 that the forward switch 1121b is not in the ON state. The process proceeds to step S1012 if determined by the control unit 1015 that the forward switch 1121b is in the ON state.

In step S1004, the control unit 1015 determines whether or not the reverse switch 1122b (see FIG. 15) of the manual switch 1012b for the back seat 1020b is in the ON state. The process proceeds to step S1005 if determined by the control unit 1015 that the reverse switch 1122b is not in the ON state. The process proceeds to step S1012 if determined by the control unit 1015 that the reverse switch 1122b is in the ON state.

In step S1005, the control unit 1015 determines whether or not the forward switch 1131a (see FIG. 15) of the auto switch 1013a for the front seat 1020a is turned ON, or whether or not the front seat 1020a is moving forward by the forward switch 1131a. The process proceeds to step S1006 if determined by the control unit 1015 that the forward switch 1131a is not turned ON and that the front seat 1020a is not moving forward by the forward switch 1131a. The process proceeds to step S1012 if determined by the control unit 1015 that the forward switch 1131a is turned ON or that the front seat 1020a is moving forward by the forward switch 1131a.

In step S1006, the control unit 1015 determines whether or not the reverse switch 1132b (see FIG. 15) of the auto switch 1013b for the back seat 1020b is turned ON, or whether or not the back seat 1020b is moving backward by the reverse switch 1132b. The process proceeds to step S1007 if determined by the control unit 1015 that the reverse switch 1132b is not turned ON and that the back seat 1020b is not moving backward by the reverse switch 1132b. The process proceeds to step S1012 if determined by the control unit 1015 that the reverse switch 1132b is turned ON or that the back seat 1020b is moving backward by the reverse switch 1132b.

In step S1007, the control unit 1015 determines whether or not the reverse switch 1132a (see FIG. 15) of the auto switch 1013a for the front seat 1020a is turned ON, or whether or not the front seat 1020a is moving backward by the reverse switch 1132a. The process proceeds to step S1008 if determined by the control unit 1015 that the reverse switch 1132a is turned ON or that the front seat 1020a is moving backward by the reverse switch 1132a. The process proceeds to step S1009 if determined by the control unit 1015 that the reverse switch 1132a is not turned ON and that the front seat 1020a is not moving backward by the reverse switch 1132a.

In step S1008, the control unit 1015 determines whether or not the forward switch 1131b (see FIG. 15) of the auto switch 1013b for the back seat 1020b is turned ON, or whether or not the back seat 1020b is moving forward by the forward switch 1131b. The process proceeds to step S1011 if determined by the control unit 1015 that the forward switch 1131b is turned ON or that the back seat 1020b is moving forward by the forward switch 1131b. The process proceeds to step S1012 if determined by the control unit 1015 that the forward switch 1131b is not turned ON and that the back seat 1020b is not moving forward by the forward switch 1131b.

In step S1009, the control unit 1015 determines whether or not the forward switch 1131b of the auto switch 1013b for the back seat 1020b is turned ON, or whether or not the back seat 1020b is moving forward by the forward switch 1131b. The process proceeds to step S1010 if determined by the control unit 1015 that the forward switch 1131b is turned ON or that the back seat 1020b is moving forward by the forward switch 1131b. The process proceeds to step S1012 if determined by the control unit 1015 that the forward switch 1131b is not turned ON and that the back seat 1020b is not moving forward by the forward switch 1131b.

In step S1010, the control unit 1015 determines whether or not the reverse switch 1132a of the auto switch 1013a for the front seat 1020a is turned ON, or whether or not the front seat 1020a is moving backward by the reverse switch 1132a. The process proceeds to step S1011 if determined by the control unit 1015 that the reverse switch 1132a is turned ON or that the front seat 1020a is moving backward by the reverse switch 1132a. The process proceeds to step S1012 if determined by the control unit 1015 that the reverse switch 1132a is not turned ON and that the front seat 1020a is not moving backward by the reverse switch 1132a.

In the first embodiment, the control unit 1015 prohibits the drive of the motors 1011a and 1011b (see FIG. 15) in step S1011, and thereafter, the series of operations are terminated. Specifically, if the reverse switch 1132a of the auto switch 1013a for the front seat 1020a is turned ON (Yes in step S1007), and thereafter, the forward switch 1131b of the auto switch 1013b for the back seat 1020b is turned ON (Yes in step S1008) before the front seat 1020a starts the backward movement operation, the control unit 1015 does not drive the motors 1011a and 1011b. If the forward switch 1131b of the auto switch 1013b for the back seat 1020b is turned ON (Yes in step S1008) while the front seat 1020a is moving backward (Yes in step S1007) by the reverse switch 1132a of the auto switch 1013a, the control unit 1015 stops driving the motor 1011a and does not drive the motor 1011b. If the forward switch 1131b of the auto switch 1013b for the back seat 1020b is turned ON (Yes in step S1009), and thereafter, the reverse switch 1132a of the auto switch 1013a for the front seat 1020a is turned ON (Yes in step S1010) before the back seat 1020b starts the forward movement operation, the control unit 1015 does not drive the motors 1011a and 1011b. If the reverse switch 1132a of the auto switch 1013a for the front seat 1020a is turned ON (Yes in step S1010) while the back seat 1020b is moving forward (Yes in step S1009) by the forward switch 1131b of the auto switch 1013b, the control unit 1015 stops driving the motor 1011b and does not drive the motor 1011a.

In step S1012, the control unit 1015 performs the motor driving process, to be hereinafter described, and thereafter, the series of operations are terminated.

Figure 18:
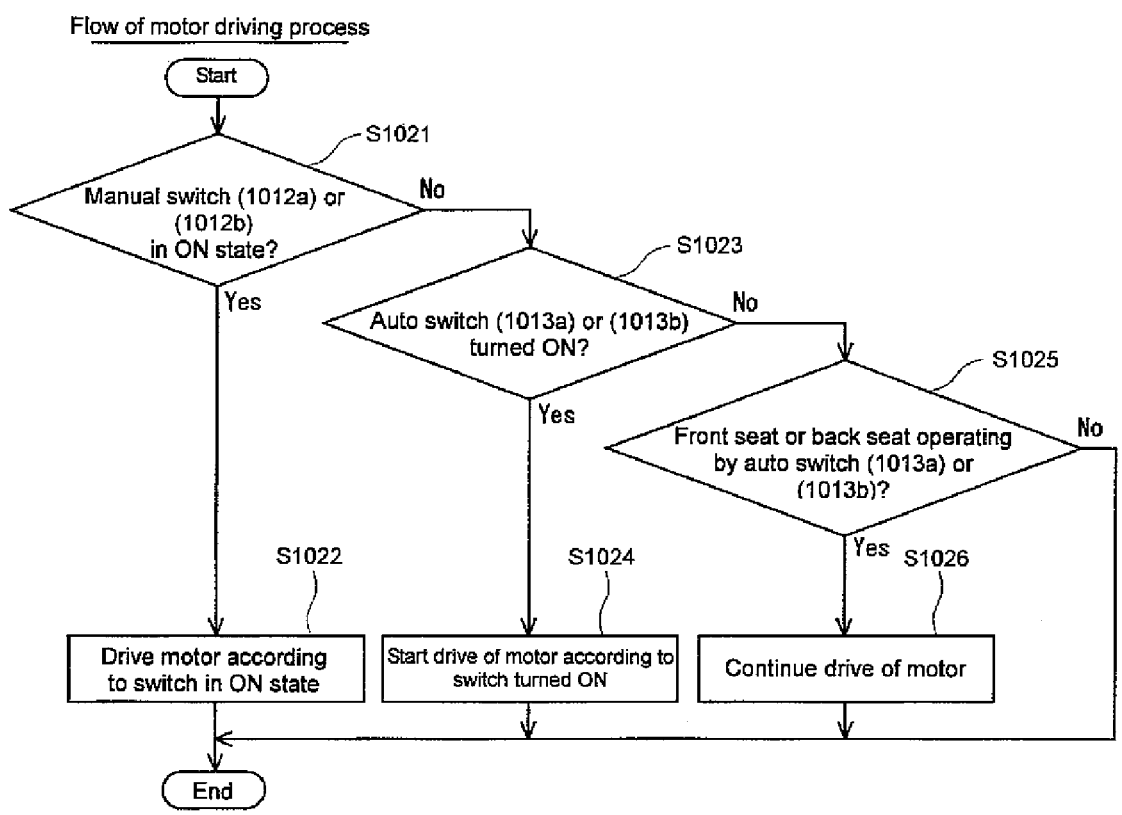
FIG. 18 is a flowchart for describing the motor driving process of the seat control device according to the first embodiment of the present invention.

FIG. 18 is a flowchart for describing the motor driving process of the seat control device according to the first embodiment of the present invention. The motor driving process of the seat control device 1010 according to the first embodiment will be described with reference to FIGS. 15, 17, and 18.

First, in the seat control device 1010 (see FIG. 15), the control unit 1015 (see FIG. 15) determines whether or not the manual switch 1012a (see FIG. 15) for the front seat 1020a or the manual switch 1012b (see FIG. 15) for the back seat 1020b is in the ON state in step S1021 of FIG. 18. The process proceeds to step S1022 if determined by the control unit 1015 that the manual switch 1012a or 1012b is in the ON state. The process proceeds to step S1023 if determined by the control unit 1015 that the manual switch 1012a and 1012b is not in the ON state.

In step S1022, the motor is driven according to the switch in the ON state by the control unit 1015, and thereafter, the process is terminated. Specifically, if the forward switch 1121a of the manual switch 1012a for the front seat 1020a is in the ON state (Yes in step S1001 of FIG. 17), the control unit 1015 drives the motor 1011a (see FIG. 15) so that the front seat 1020a moves forward. If the reverse switch 1122a of the manual switch 1012a for the front seat 1020a is in the ON state (Yes in step S1002 of FIG. 17), the control unit 1015 drives the motor 1011a so that the front seat 1020a moves backward. If the forward switch 1121b of the manual switch 1012b for the back seat 1020b is in the ON state (Yes in step S1003 of FIG. 17), the control unit 1015 drives the motor 1011b (see FIG. 15) so that the back seat 1020b moves forward. If the reverse switch 1122b of the manual switch 1012b for the back seat 1020b is in the ON state (Yes in step S1004 of FIG. 17), the control unit 1015 drives the motor 1011b so that the back seat 1020b moves backward.

In step S1023, the control unit 1015 determines whether or not the auto switch 1013a (see FIG. 15) for the front seat 1020a or the auto switch 1013b (see FIG. 15) for the back seat 1020b is turned ON. The process proceeds to step S1024 if determined by the control unit 1015 that the auto switch 1013a or 1013b is turned ON. The process proceeds to step S1025 if determined by the control unit 1015 that the auto switch 1013a and 1013b is not turned ON.

In step S1024, the control unit 1015 starts to drive the motor according to the switch turned ON, and thereafter, the process is terminated. Specifically, if the forward switch 1131a of the auto switch 1013a for the front seat 1020a is turned ON (Yes in step S1005 of FIG. 17), the control unit 1015 starts to drive the motor 1011a so that the front seat 1020a moves forward. If the reverse switch 1132b of the auto switch 1013b for the back seat 1020b is turned ON (Yes in step S1006 of FIG. 17), the control unit 1015 starts to drive the motor 1011b so that the back seat 1020b moves backward. If the reverse switch 1132a of the auto switch 1013a for the front seat 1020a is turned ON (Yes in step S1007 of FIG. 17), and the forward switch 1131b of the auto switch 1013b for the back seat 1020b is not turned ON (No in step S1008 of FIG. 17), the control unit 1015 starts to drive the motor 1011a so that the front seat 1020a moves backward. If the forward switch 1131b of the auto switch 1013b for the back seat 1020b is turned ON (Yes in step S1009 of FIG. 17), and the reverse switch 1132a of the auto switch 1013a for the front seat 1020a is not turned ON (No in step S1010 of FIG. 17), the control unit 1015 starts to drive the motor 1011b so that the back seat 1020b moves forward.

In step S1025, the control unit 1015 determines whether or not the front seat 1020a is operating by the auto switch 1013a or the back seat 1020b is operating by the auto switch 1013b. The process proceeds to step S1026 if determined by the control unit 1015 that the front seat 1020a or the back seat 1020b is operating. The process is terminated if determined by the control unit 1015 that the front seat 1020a and the back seat 1020b are not operating. Specifically, if the front seat 1020a is not moving backward by the reverse switch 1132a (No in step S1007 of FIG. 17), and the back seat 1020b is not moving forward by the forward switch 1131b (No in step S1009 of FIG. 17), the process is terminated without driving the motors 1011a and 1011b. In other words, in this case, the front seat 1020a and the back seat 1020b are stopped.

In step S1026, the control unit 1015 continues to drive the motor 1011a or 1011b, and thereafter, the process is terminated. Specifically, if the front seat 1020a is moving forward by the forward switch 1131a of the auto switch 1013a (Yes in step S1005 of FIG. 17), the control unit 1015 continues to drive the motor 1011a. If the back seat 1020b is moving backward by the reverse switch 1132b of the auto switch 1013b (Yes in step S1006 of FIG. 17), the control unit 1015 continues to drive the motor 1011b. If the front seat 1020a is moving backward by the reverse switch 1132a of the auto switch 1013a (Yes in step S1007 of FIG. 17), and the forward switch 1131b of the auto switch 1013b for the back seat 1020b is not turned ON (No in step S1008 of FIG. 17), the control unit 1015 continues to drive the motor 1011a. If the back seat 1020b is moving forward by the forward switch 1131b of the auto switch 1013b (Yes in step S1009 of FIG. 17), and the reverse switch 1132a of the auto switch 1013a for the front seat 1020a is not turned ON (No in step S1010 of FIG. 17), the control unit 1015 continues to drive the motor 1011b.

In the first embodiment, the control unit 1015 prohibits the drive of the motors 1011a and 1011b (step S1011 of FIG. 17) if the forward switch 1131b of the auto switch 1013b for the back seat 1020b is turned ON (Yes in step S1008 of FIG. 17) when the reverse switch 1132a of the auto switch 1013a for the front seat 1020a is turned ON or while the front seat 1020a is moving backward by the reverse switch 1132a (Yes in step S1007 of FIG. 17); and the control unit 1015 prohibits the drive of the motors 1011a and 1011b (step S1011 of FIG. 17) if the reverse switch 1132a of the auto switch 1013a for the front seat 1020a is turned ON (Yes in step S1010 of FIG. 17) when the forward switch 1131b of the auto switch 1013b for the back seat 1020b is turned ON or while the back seat 1020b is moving forward by the forward switch 1131b (Yes in step S1009 of FIG. 17), so that the backward movement operation of the front seat 1020a and the forward movement operation of the back seat 1020b are prohibited from being simultaneously carried out, whereby occurrence of trapping of the object existing between the front seat 1020a and the back seat 1020b is suppressed.

The configuration of the seat control device 1010 according to a second embodiment of the present invention will now be described with reference to FIG. 15. In the second embodiment, the seat control device 1010 in which the forward movement operation of the back seat 1020b by the auto switch 1013b is performed in preference to the backward movement operation of the front seat 1020a by the auto switch 1013a, as opposed to the first embodiment, is described.

In FIG. 15, the seat control device 1010 according to the second embodiment is configured to prohibit the backward movement operation of the front seat 1020a and to perform the forward movement operation of the back seat 1020b when the reverse switch 1132a of the auto switch 1013a for the front seat 1020a and the forward switch 1131b of the auto switch 1013b for the back seat 1020b are simultaneously pushed. Specifically, the seat control device 1010 is configured such that the control unit 1015 starts to drive the motor 1011b and does not drive the motor 1011a when the reverse switch 1132a and the forward switch 1131b are simultaneously turned ON.

In the second embodiment, the seat control device 1010 is configured to cancel the backward movement operation of the front seat 1020a and to start the forward movement operation of the back seat 1020b when the forward switch 1131b of the auto switch 1013b for the back seat 1020b is pushed during the backward movement operation of the front seat 1020a by the reverse switch 1132a of the auto switch 1013a. Specifically, the seat control device 1010 is configured such that the control unit 1015 stops driving the motor 1011a and starts to drive the motor 1011b when the forward switch 1131b is turned ON during the backward movement operation of the front seat 1020a by the reverse switch 1132a.

In the second embodiment, the seat control device 1010 is configured to continue the forward movement operation of the back seat 1020b and to prohibit the backward movement operation of the front seat 1020a when the reverse switch 1132a of the auto switch 1013a for the front seat 1020a is pushed during the forward movement operation of the back seat 1020b by the forward switch 1131b of the auto switch 1013b. Specifically, the seat control device 1010 is configured such that the control unit 1015 continues to drive the motor 1011b and does not drive the motor 1011a when the reverse switch 1132a is turned ON during the forward movement operation of the back seat 1020b by the forward switch 1131b.

Other configurations of the second embodiment are similar to the first embodiment.

Figure 19:
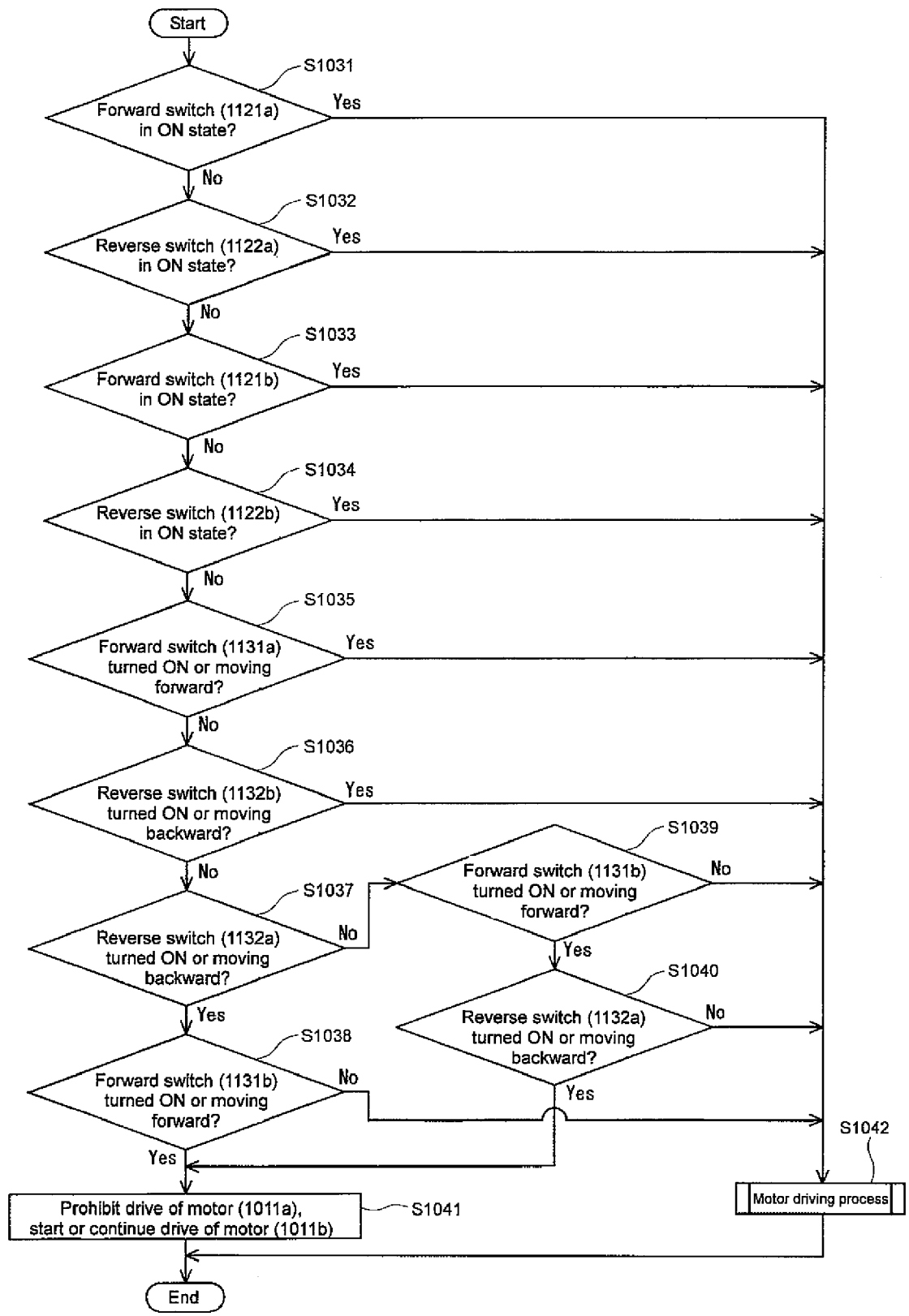
FIG. 19 is a flowchart for describing the operation of the seat control device according to a second embodiment of the present invention.

FIG. 19 is a flowchart for describing the operation of the seat control device according to the second embodiment of the present invention. The operation of the seat control device 1010 according to the second embodiment will be described with reference to FIGS. 15 and 19. The following operations are repeatedly performed in the seat control device 1010. Steps S1031 to S1040 and S1042 of FIG. 19 are similar to steps S1001 to S1010 and S1012 of FIG. 17 described above, and thus the description thereof will not be given.

In the second embodiment, the control unit 1015 (see FIG. 15) prohibits the drive of the motor 1011a (see FIG. 15) and starts or continues to drive the motor 1011b (see FIG. 15) in step S1041 of FIG. 19, and thereafter, the series of operations are terminated. Specifically, if the reverse switch 1132a (see FIG. 15) of the auto switch 1013a for the front seat 1020a is turned ON (Yes in step S1037), and thereafter, the forward switch 1131b (see FIG. 15) of the auto switch 1013b for the back seat 1020b is turned ON (Yes in step S1038) before the front seat 1020a starts the backward movement operation, the control unit 1015 starts to drive the motor 1011b and does not drive the motor 1011a. If the forward switch 1131b of the auto switch 1013b for the back seat 1020b is turned ON (Yes in step S1038) while the front seat 1020a is moving backward (Yes in step S1037) by the reverse switch 1132a of the auto switch 1013a, the control unit 1015 starts to drive the motor 1011b and stops driving the motor 1011a. If the forward switch 1131b of the auto switch 1013b for the back seat 1020b is turned ON (Yes in step S1039), and thereafter, the reverse switch 1132a of the auto switch 1013a for the front seat 1020a is turned ON (Yes in step S1040) before the back seat 1020b starts the forward movement operation, the control unit 1015 starts to drive the motor 1011b and does not drive the motor 1011a. If the reverse switch 1132a of the auto switch 1013a for the front seat 1020a is turned ON (Yes in step S1040) while the back seat 1020b is moving forward (Yes in step S1039) by the forward switch 1131b of the auto switch 1013b, the control unit 1015 continues to drive the motor 1011b and does not drive the motor 1011a.

In the second embodiment, the control unit 1015 prohibits the drive of the motor 1011a and drives the motor 1011b (step S1041 of FIG. 19) when the forward switch 1131b of the auto switch 1013b for the back seat 1020b is turned ON (Yes in step S1038 of FIG. 19) when the reverse switch 1132a of the auto switch 1013a for the front seat 1020a is turned ON or while the front seat 1020a is moving backward by the reverse switch 1132a (Yes in step S1037 of FIG. 19), and the control unit 1015 prohibits the drive of the motor 1011a and drives the motor 1011b (step S1041 of FIG. 19) when the reverse switch 1132a of the auto switch 1013a for the front seat 1020a is turned ON (Yes in step S1040 of FIG. 19) when the forward switch 1131b of the auto switch 1013b for the back seat 1020b is turned ON or while the back seat 1020b is moving forward by the forward switch 1131b (Yes in step S1039 of FIG. 19), so that the backward movement operation of the front seat 1020a and the forward movement operation of the back seat 1020b are prohibited from being simultaneously carried out, whereby occurrence of trapping of the object existing between the front seat 1020a and the back seat 1020b is suppressed.

In the second embodiment, the forward movement operation of the back seat 1020b by the auto switch 1013b can be carried out while suppressing the backward movement operation of the front seat 1020a and the forward movement operation of the back seat 1020b from being simultaneously carried out, as opposed to the first embodiment, by performing the forward movement operation of the back seat 1020b by the auto switch 1013b in preference to the backward movement operation of the front seat 1020a by the auto switch 1013a, thereby enhancing the convenience of the user.

(Third Embodiment)

The configuration of the seat control device 1010 according to a third embodiment of the present invention will now be described with reference to FIG. 15. In the third embodiment, the seat control device 1010 in which the backward movement operation of the front seat 1020a by the auto switch 1013a is performed in preference to the forward movement operation of the back seat 1020b by the auto switch 1013b, as opposed to the first embodiment, is described.

In FIG. 15, the seat control device 1010 according to the third embodiment is configured to prohibit the forward movement operation of the back seat 1020b and to perform the backward movement operation of the front seat 1020a when the reverse switch 1132a of the auto switch 1013a for the front seat 1020a and the forward switch 1131b of the auto switch 1013b for the back seat 1020b are simultaneously pushed. Specifically, the seat control device 1010 is configured such that the control unit 1015 starts to drive the motor 1011a and does not drive the motor 1011b when the reverse switch 1132a and the forward switch 1131b are simultaneously turned ON.

In the third embodiment, the seat control device 1010 is configured to continue the backward movement operation of the front seat 1020a and to prohibit the forward movement operation of the back seat 1020b when the forward switch 1131b of the auto switch 1013b for the back seat 1020b is pushed during the backward movement operation of the front seat 1020a by the reverse switch 1132a of the auto switch 1013a. Specifically, the seat control device 1010 is configured such that the control unit 1015 continues to drive the motor 1011a and does not drive the motor 1011b when the forward switch 1131b is turned ON during the backward movement operation of the front seat 1020a by the reverse switch 1132a.

In the third embodiment, the seat control device 1010 is configured to cancel the forward movement operation of the back seat 1020b and to start the backward movement operation of the front seat 1020a when the reverse switch 1132a of the auto switch 1013a for the front seat 1020a is pushed during the forward movement operation of the back seat 1020b by the forward switch 1131b of the auto switch 1013b. Specifically, the seat control device 1010 is configured such that the control unit 1015 stops driving the motor 1011b and starts to drive the motor 1011a when the reverse switch 1132a is turned ON during the forward movement operation of the back seat 1020b by the forward switch 1131b.

Other configurations of the third embodiment are similar to the first embodiment.

Figure 20:
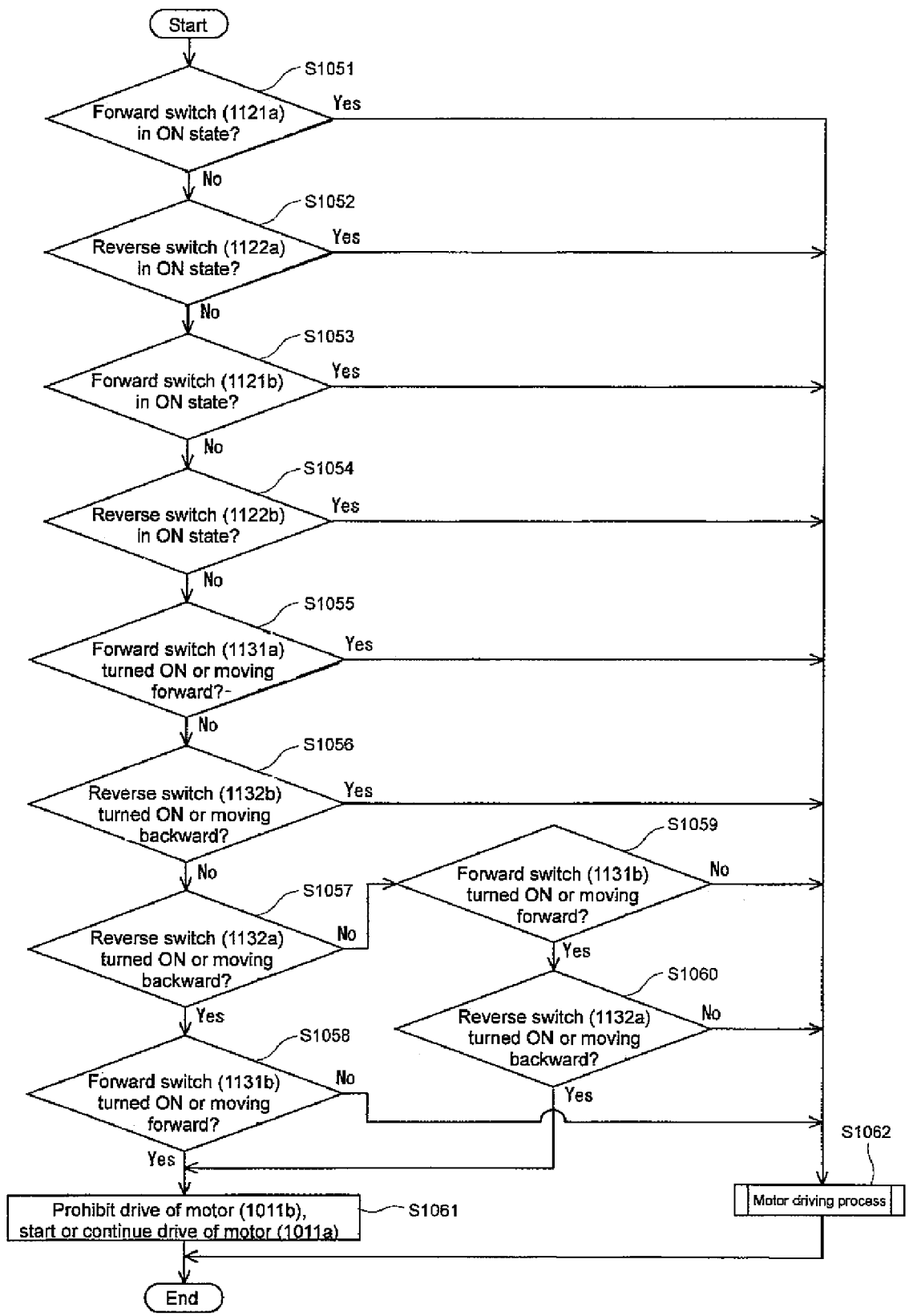
FIG. 20 is a flowchart for describing the operation of the seat control device according to a third embodiment of the present invention.

FIG. 20 is a flowchart for describing the operation of the seat control device according to the third embodiment of the present invention. The operation of the seat control device 1010 according to the third embodiment will be described with reference to FIGS. 15 and 20. The following operations are repeatedly performed in the seat control device 1010. Steps S1051 to S1060 and S1062 of FIG. 20 are similar to steps S1001 to S1010 and S1012 of FIG. 17 described above, and thus the description thereof will not be given.

In the third embodiment, the control unit 1015 (see FIG. 15) prohibits the drive of the motor 1011b (see FIG. 15) and starts or continues to drive the motor 1011a (see FIG. 15) in step S1061 of FIG. 20, and thereafter, the series of operations are terminated. Specifically, if the reverse switch 1132a (see FIG. 15) of the auto switch 1013a for the front seat 1020a is turned ON (Yes in step S1057), and thereafter, the forward switch 1131b (see FIG. 15) of the auto switch 1013b for the back seat 1020b is turned ON (Yes in step S1058) before the front seat 1020a starts the backward movement operation, the control unit 1015 starts to drive the motor 1011a and does not drive the motor 1011b. If the forward switch 1131b of the auto switch 1013b for the back seat 1020b is turned ON (Yes in step S1058) while the front seat 1020a is moving backward (Yes in step S1057) by the reverse switch 1132a of the auto switch 1013a, the control unit 1015 continues to drive the motor 1011a and does not drive the motor 1011b. If the forward switch 1131b of the auto switch 1013b for the back seat 1020b is turned ON (Yes in step S1059), and thereafter, the reverse switch 1132a of the auto switch 1013a for the front seat 1020a is turned ON (Yes in step S1060) before the back seat 1020b starts the forward movement operation, the control unit 1015 starts to drive the motor 1011a and does not drive the motor 1011b. If the reverse switch 1132a of the auto switch 1013a for the front seat 1020a is turned ON (Yes in step S1060) while the back seat 1020b is moving forward (Yes in step S1059) by the forward switch 1131b of the auto switch 1013b, the control unit 1015 stops driving the motor 1011b and starts to drive the motor 1011a.

In the third embodiment, the control unit 1015 prohibits the drive of the motor 1011*b* and drives the motor 1011*a* (step S1061 of FIG. 20) when the forward switch 1131*b* of the auto switch 1013*b* for the back seat 1020*b* is turned ON (Yes in step S1058 of FIG. 20) when the reverse switch 1132*a* of the auto switch 1013*a* for the front seat 1020*a* is turned ON or while the front seat 1020*a* is moving backward by the reverse switch 1132*a* (Yes in step S1057 of FIG. 20), and the control unit 1015 prohibits the drive of the motor 1011*b* and drives the motor 1011*a* (step S1061 of FIG. 20) when the reverse switch 1132*a* of the auto switch 1013*a* for the front seat 1020*a* is turned ON (Yes in step S1060 of FIG. 20) when the forward switch 1131*b* of the auto switch 1013*b* for the back seat 1020*b* is turned ON or while the back seat 1020*b* is moving forward by the forward switch 1131*b* (Yes in step S1059 of FIG. 20), so that the backward movement operation of the front seat 1020*a* and the forward movement operation of the back seat 1020*b* are prohibited from being simultaneously carried out, whereby occurrence of trapping of the object existing between the front seat 1020*a* and the back seat 1020*b* is suppressed.

In the third embodiment, the backward movement operation of the front seat 1020*a* by the auto switch 1013*a* can be carried out while suppressing the backward movement operation of the front seat 1020*a* and the forward movement operation of the back seat 1020*b* from being simultaneously carried out, as opposed to the first embodiment, by performing the backward movement operation of the front seat 1020*a* by the auto switch 1013*a* in preference to the forward movement operation of the back seat 1020*b* by the auto switch 1013*b*, thereby enhancing the convenience of the user.

(Fourth Embodiment)

The configuration of the seat control device 1010 according to a fourth embodiment of the present invention will now be described with reference to FIG. 15. In the fourth embodiment, the seat control device 1010 in which the forward movement operation of the back seat 1020*b* by the manual switch 1012*b* is performed in preference to the backward movement operation of the front seat 1020*a* by the auto switch 1013*a* is described.

In FIG. 15, the seat control device 1010 according to the fourth embodiment is configured to prohibit the backward movement operation of the front seat 1020*a* and to perform the forward movement operation of the back seat 1020*b* when the reverse switch 1132*a* of the auto switch 1013*a* for the front seat 1020*a* and the forward switch 1121*b* of the manual switch 1012*b* for the back seat 1020*b* are simultaneously pushed. Specifically, the seat control device 1010 is configured such that the control unit 1015 starts to drive the motor 1011*b* and does not drive the motor 1011*a* when the reverse switch 1132*a* and the forward switch 1121*b* are simultaneously turned ON. A case where the reverse switch 1132*a* and the forward switch 1121*b* are simultaneously pushed includes a case where the forward switch 1121*b* is pushed before the front seat 1020*a* starts the backward movement operation after the reverse switch 1132*a* is pushed, and a case where the reverse switch 1132*a* is pushed before the back seat 1020*b* starts the forward movement operation after the forward switch 1121*b* is pushed.

In the fourth embodiment, the seat control device 1010 is configured to cancel the backward movement operation of the front seat 1020*a* and to start the forward movement operation of the back seat 1020*b* when the forward switch 1121*b* of the manual switch 1012*b* for the back seat 1020*b* is pushed during the backward movement operation of the front seat 1020*a* by the reverse switch 1132*a* of the auto switch 1013*a*. Specifically, the seat control device 1010 is configured such that the control unit 1015 stops driving the motor 1011*a* and starts to drive the motor 1011*b* when the forward switch 1121*b* is turned ON during the backward movement operation of the front seat 1020*a* by the reverse switch 1132*a*.

In the fourth embodiment, the seat control device 1010 is configured to continue the forward movement operation of the back seat 1020*b* and to prohibit the backward movement operation of the front seat 1020*a* when the reverse switch 1132*a* of the auto switch 1013*a* for the front seat 1020*a* is pushed during the forward movement operation of the back seat 1020*b* by the forward switch 1121*b* of the manual switch 1012*b*. Specifically, the seat control device 1010 is configured such that the control unit 1015 continues to drive the motor 1011*b* and does not drive the motor 1011*a* when the reverse switch 1132*a* is turned ON during the forward movement operation of the back seat 1020*b* by the forward switch 1121*b*.

Other configurations of the fourth embodiment are similar to the second embodiment.

Figure 21:
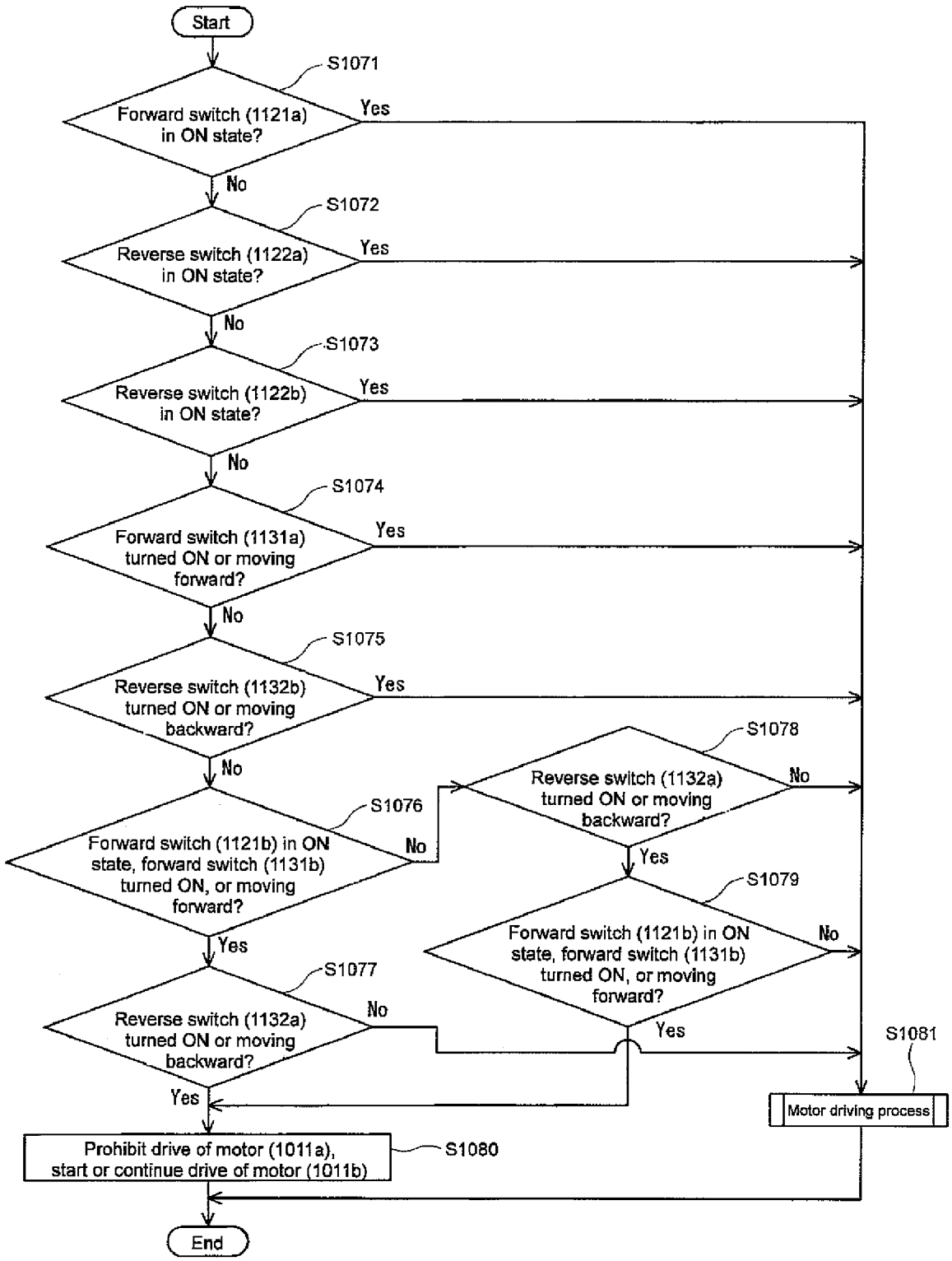
FIG. 21 is a flowchart for describing the operation of the seat control device according to a fourth embodiment of the present invention.

FIG. 21 is a flowchart for describing the operation of the seat control device according to the fourth embodiment of the present invention. The operation of the seat control device 1010 according to the fourth embodiment will be described with reference to FIGS. 15 and 21. The following operations are repeatedly performed in the seat control device 1010. Steps S1071, S1072, S1073, S1074, S1075, and S1081 of FIG. 21 are similar to steps S1001, S1002, S1004, S1005, S1006, S1012 of FIG. 17 described above, and thus the description thereof will not be given.

In the fourth embodiment, the control unit 1015 (see FIG. 15) determines whether or not the forward switch 1121*b* (see FIG. 15) of the manual switch 1012*b* for the back seat 1020*b* is in the ON state, whether or not the forward switch 1131*b* (see FIG. 15) of the auto switch 1013*b* for the back seat 1020*b* is turned ON, or whether or not the back seat 1020*b* is moving forward by the forward switch 1131*b* in step S1076 of FIG. 21. If determined by the control unit 1015 that the forward switch 1121*b* is in the ON state, the forward switch 1131*b* is turned ON, or the back seat 1020*b* is moving forward by the forward switch 1131*b*, the process proceeds to step S1077. If determined by the control unit 1015 that the forward switch 1121*b* is not in the ON state, the forward switch 1131*b* is not turned ON, and the back seat 1020*b* is not moving forward by the forward switch 1131*b*, the process proceeds to step S1078.

In step S1077, the control unit 1015 determines whether or not the reverse switch 1132*a* (see FIG. 15) of the auto switch 1013*a* for the front seat 1020*a* is turned ON, or whether or not the front seat 1020*a* is moving backward by the reverse switch 1132*a*. If determined by the control unit 1015 that the reverse switch 1132*a* is turned ON or that the front seat 1020*a* is moving backward by the reverse switch 1132*a*, the process proceeds to step S1080. If determined by the control unit 1015 that the reverse switch 1132*a* is not turned ON and that the front seat 1020*a* is not moving backward by the reverse switch 1132*a*, the process proceeds to step S1081.

In step S1078, the control unit 1015 determines whether or not the reverse switch 1132*a* of the auto switch 1013*a* for the front seat 1020*a* is turned ON, or whether or not the front seat 1020*a* is moving backward by the reverse switch 1132*a*. If determined by the control unit 1015 that the reverse switch 1132*a* is turned ON or that the front seat 1020*a* is moving backward by the reverse switch 1132*a*, the process proceeds to step S1079. If determined by the control unit 1015 that the reverse switch 1132*a* is not turned ON and that the front seat 1020*a* is not moving backward by the reverse switch 1132*a*, the process proceeds to step S1081.

In step S1079, the control unit 1015 determines whether or not the forward switch 1121b of the manual switch 1012b for the back seat 1020b is in the ON state, whether or not the forward switch 1131b of the auto switch 1013b for the back seat 1020b is turned ON, or whether or not the back seat 1020b is moving forward by the forward switch 1131b. If determined by the control unit 1015 that the forward switch 1121b is in the ON state, the forward switch 1131b is turned ON, or the back seat 1020b is moving forward by the forward switch 1131b, the process proceeds to step S1080. If determined by the control unit 1015 that the forward switch 1121b is not in the ON state, the forward switch 1131b is not turned ON, and the back seat 1020b is not moving forward by the forward switch 1131b, the process proceeds to step S1081.

The control unit 1015 prohibits the drive of the motor 1011a (see FIG. 15) and starts or continues to drive the motor 1011b (see FIG. 15) in step S1080, and thereafter, the series of operations are terminated. Specifically, if the reverse switch 1132a of the auto switch 1013a for the front seat 1020a is turned ON (Yes in step S1077), when the forward switch 1121b of the manual switch 1012b for the back seat 1020b is in the ON state (Yes in step S1076), the control unit 1015 drives the motor 1011b and does not drive the motor 1011a. If the reverse switch 1132a of the auto switch 1013a for the front seat 1020a is turned ON (Yes in step S1078), and thereafter, the forward switch 1121b of the manual switch 1012b for the back seat 1020b is turned ON (Yes in step S1079) before the front seat 1020a starts the backward movement operation, the control unit 1015 starts to drive the motor 1011b and does not drive the motor 1011a. If the forward switch 1121b of the manual switch 1012b for the back seat 1020b is turned ON (Yes in step S1079) while the front seat 1020a is moving backward (Yes in step S1078) by the reverse switch 1132a of the auto switch 1013a, the control unit 1015 starts to drive the motor 1011b and stops driving the motor 1011a.

If the forward switch 1131b of the auto switch 1013b for the back seat 1020b is turned ON (Yes in step S1076), and thereafter, the reverse switch 1132a of the auto switch 1013a for the front seat 1020a is turned ON (Yes in step S1077) before the back seat 1020b starts the forward movement operation, the control unit 1015 starts to drive the motor 1011b and does not drive the motor 1011a. If the reverse switch 1132a of the auto switch 1013a for the front seat 1020a is turned ON (Yes in step S1077) while the back seat 1020b is moving forward (Yes in step S1076) by the forward switch 1131b of the auto switch 1013b, the control unit 1015 continues to drive the motor 1011b and does not drive the motor 10111a.

If the reverse switch 1132a of the auto switch 1013a for the front seat 1020a is turned ON (Yes in step S1078), and thereafter, the forward switch 1131b of the auto switch 1013b for the back seat 1020b is turned ON (Yes in step S1079) before the front seat 1020a starts the backward movement operation, the control unit 1015 starts to drive the motor 1011b and does not drive the motor 1011a. If the forward switch 1131b of the auto switch 1013b for the back seat 1020b is turned ON (Yes in step S1079) while the front seat 1020a is moving backward (Yes in step S1078) by the reverse switch 1132a of the auto switch 1013a, the control unit 1015 starts to drive the motor 1011b and stops driving the motor 1011a.

In the fourth embodiment, the backward movement operation of the front seat 1020a and the forward movement operation of the back seat 1020b are prohibited from being simultaneously carried out by performing the forward movement operation of the back seat 1020b by the manual switch 1012b in preference to the backward movement operation of the front seat 1020a by the auto switch 1013a, and thus occurrence of trapping of the object existing between the front seat 1020a and the back seat 1020b is suppressed. Since the manual operation of the manual switch 1012b is based on the assumption that the user is seated, the back seat 1020b having a high possibility the user is seated can be operated with preference than the front seat 1020a having a possibility the user is not seated, thereby enhancing the convenience of the user.

Other effects of the fourth embodiment are similar to the second embodiment.

(Fifth Embodiment)

The configuration of the seat control device 1010 according to a fifth embodiment of the present invention will now be described with reference to FIG. 15. In the fifth embodiment, the seat control device 1010 in which the backward movement operation of the front seat 1020a by the manual switch 1012a is performed in preference to the forward movement operation of the back seat 1020b by the auto switch 1013b is described.

In FIG. 15, the seat control device 1010 according to the fifth embodiment is configured to prohibit the forward movement operation of the back seat 1020b and to perform the backward movement operation of the front seat 1020a when the reverse switch 1122a of the manual switch 1012a for the front seat 1020a and the forward switch 1131b of the auto switch 1013b for the back seat 1020b are simultaneously pushed. Specifically, the seat control device 1010 is configured such that the control unit 1015 starts to drive the motor 1011a and does not drive the motor 1011b when the reverse switch 1122a and the forward switch 1131b are simultaneously turned ON. A case where the reverse switch 1122a and the forward switch 1131b are simultaneously pushed includes a case where the forward switch 1131b is pushed before the front seat 1020a starts the backward movement operation after the reverse switch 1122a is pushed, and a case where the reverse switch 1122a is pushed before the back seat 1020b starts the forward movement operation after the forward switch 1131b is pushed.

In the fifth embodiment, the seat control device 1010 is configured to cancel the forward movement operation of the back seat 1020b and to start the backward movement operation of the front seat 1020a when the reverse switch 1122a of the manual switch 1012a for the front seat 1020a is pushed during the forward movement operation of the back seat 1020b by the forward switch 1131b of the auto switch 1013b. Specifically, the seat control device 1010 is configured such that the control unit 1015 stops driving the motor 1011b and starts to drive the motor 1011a when the reverse switch 1122a is turned ON during the forward movement operation of the back seat 1020b by the forward switch 1131b.

In the fifth embodiment, the seat control device 1010 is configured to continue the backward movement operation of the front seat 1020a and to prohibit the forward movement operation of the back seat 1020b when the forward switch 1131b of the auto switch 1013b for the back seat 1020b is pushed during the backward movement operation of the front seat 1020a by the reverse switch 1122a of the manual switch 1012a. Specifically, the seat control device 1010 is configured such that the control unit 1015 continues to drive the motor 1011a and does not drive the motor 1011b when the forward switch 1131b is turned ON during the backward movement operation of the front seat 1020a by the reverse switch 1122a.

Other configurations of the fifth embodiment are similar to the third embodiment.

Figure 22:
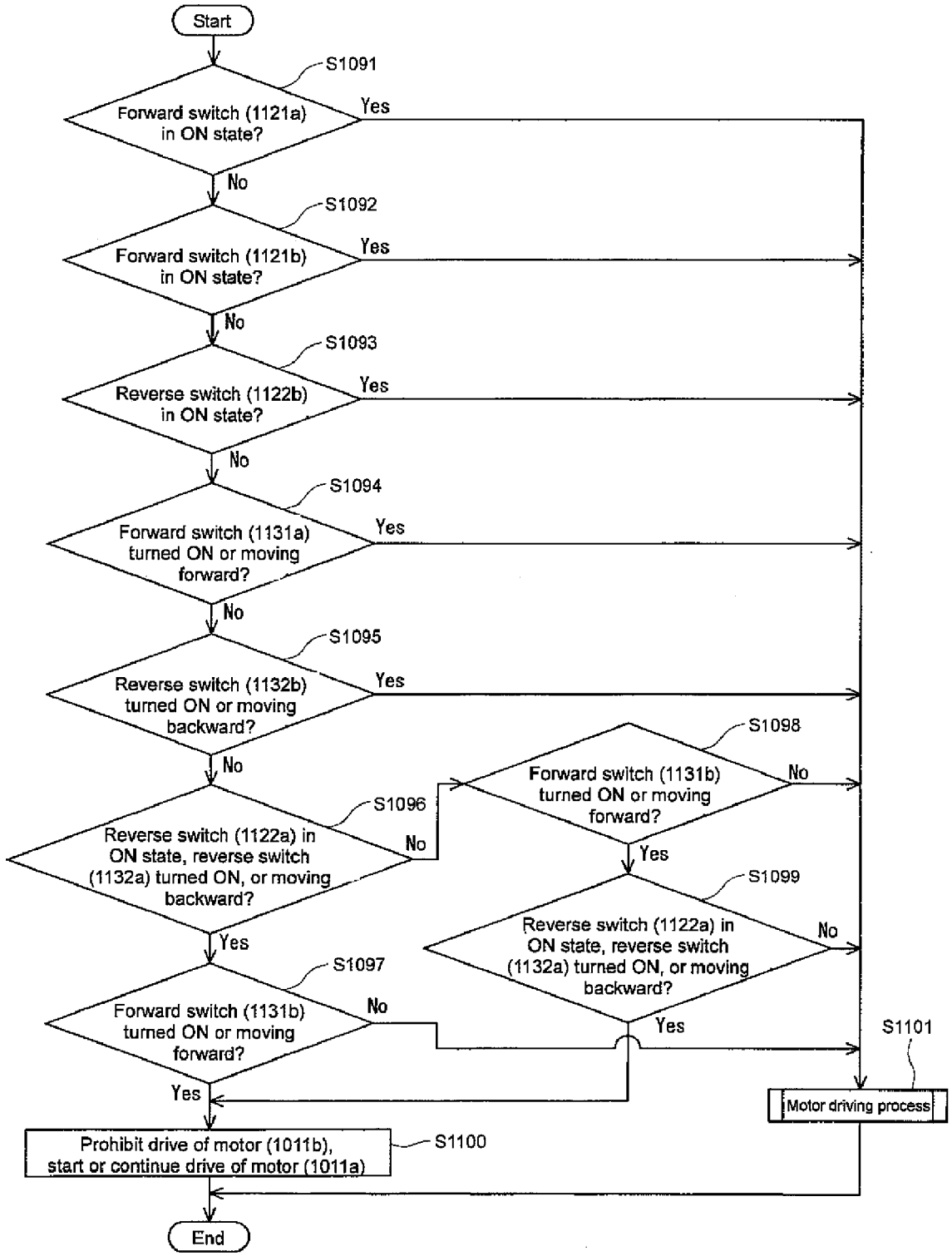
FIG. 22 is a flowchart for describing the operation of the seat control device according to a fifth embodiment of the present invention.

FIG. 22 is a flowchart for describing the operation of the seat control device according to the fifth embodiment of the present invention. The operation of the seat control device 1010 according to the fifth embodiment will be described with reference to FIGS. 15 and 22. The following operations are repeatedly performed in the seat control device 1010. Steps S1091, S1092, S1093, S1094, S1095, and S1101 of FIG. 22 are similar to steps S1001, S1003, S1004, S1005, S1006, S1012 of FIG. 17 described above, and thus the description thereof will not be given.

In the fifth embodiment, the control unit 1015 (see FIG. 15) determines whether or not the reverse switch 1122*a* (see FIG. 15) of the manual switch 1012*a* for the front seat 1020*a* is in the ON state, whether or not the reverse switch 1132*a* (see FIG. 15) of the auto switch 1013*a* for the front seat 1020*a* is turned ON, or whether or not the front seat 1020*a* is moving backward by the reverse switch 1132*a* in step S1096 of FIG. 22. If determined by the control unit 1015 that the reverse switch 1122*a* is in the ON state, the reverse switch 1132*a* is turned ON, or the front seat 1020*a* is moving backward by the reverse switch 1132*a*, the process proceeds to step S1097. If determined by the control unit 1015 that the reverse switch 1122*a* is not in the ON state, the reverse switch 1132*a* is not turned ON, and the front seat 1020*a* is not moving backward by the reverse switch 1132*a*, the process proceeds to step S1098.

In step S1097, the control unit 1015 determines whether or not the forward switch 1131*b* (see FIG. 15) of the auto switch 1013*b* for the back seat 1020*b* is turned ON, or whether or not the back seat 1020*b* is moving forward by the forward switch 1131*b*. If determined by the control unit 1015 that the forward switch 1131*b* is turned ON or that the back seat 1020*b* is moving forward by the forward switch 1131*b*, the process proceeds to step S1100. If determined by the control unit 1015 that the forward switch 1131*b* is not turned ON and that the back seat 1020*b* is not moving forward by the forward switch 1131*b*, the process proceeds to step S1101.

in step S1098, the control unit 1015 determines whether or not the forward switch 1131*b* of the auto switch 1013*b* for the back seat 1020*b* is turned ON, or whether or not the back seat 1020*b* is moving forward by the forward switch 1131*b*. If determined by the control unit 1015 that the forward switch 1131*b* is turned ON or that the back seat 1020*b* is moving forward by the forward switch 1131*b*, the process proceeds to step S1099. If determined by the control unit 1015 that the forward switch 1131*b* is not turned ON and that the back seat 1020*b* is not moving forward by the forward switch 1131*b*, the process proceeds to step S101.

In step S1099, the control unit 1015 determines whether or not the reverse switch 1122*a* of the manual switch 1012*a* for the front seat 1020*a* is in the ON state, whether or not the reverse switch 1132*a* of the auto switch 1013*a* for the front seat 1020*a* is turned ON, or whether or not the front seat 1020*a* is moving backward by the reverse switch 1132*a*. If determined by the control unit 1015 that the reverse switch 1122*a* is in the ON state, the reverse switch 1132*a* is turned ON, or the front seat 1020*a* is moving backward by the reverse switch 1132*a*, the process proceeds to step S1100. If determined by the control unit 1015 that the reverse switch 1122*a* is not in the ON state, the reverse switch 1132*a* is not turned ON, and the front seat 1020*a* is not moving backward by the reverse switch 1132*a*, the process proceeds to step S1101.

The control unit 1015 prohibits the drive of the motor 1011*b* (see FIG. 15) and starts or continues to drive of the motor 1011*a* (see FIG. 15) in step S1100, and thereafter, the series of operations are terminated. Specifically, if the forward switch 1131*b* of the auto switch 1013*b* for the back seat 1020*b* is turned ON (Yes in step S1097), when the reverse switch 1122*a* of the manual switch 1012*a* for the front seat 1020*a* is in the ON state (Yes in step S1096), the control unit 1015 drives the motor 1011*a* and does not drive the motor 1011*b*. If the forward switch 1131*b* of the auto switch 1013*b* for the back seat 1020*b* is turned ON (Yes in step S1098), and thereafter, the reverse switch 1122*a* of the manual switch 1012*a* for the front seat 1020*a* is turned ON (Yes in step S1099) before the back seat 1020*b* starts the forward movement operation, the control unit 1015 starts to drive the motor 1011*a* and does not drive the motor 1011*b*. If the reverse switch 1122*a* of the manual switch 1012*a* for the front seat 1020*a* is turned ON (Yes in step S1099) while the back seat 1020*b* is moving forward (Yes in step S1098) by the forward switch 1131*b* of the auto switch 1013*b*, the control unit 1015 starts to drive the motor 1011*a* and stops driving the motor 1011*b*.

If the reverse switch 1132*a* of the auto switch 1013*a* for the front seat 1020*a* is turned ON (Yes in step S1096), and thereafter, the forward switch 1131*b* of the auto switch 1013*b* for the back seat 1020*b* is turned ON (Yes in step S1097) before the front seat 1020*a* starts the backward movement operation, the control unit 1015 starts to drive of the motor 1011*a* and does not drive the motor 1011*b*. If the forward switch 1131*b* of the auto switch 1013*b* for the back seat 1020*b* is turned ON (Yes in step S1097) while the front seat 1020*a* is moving backward (Yes in step S1096) by the reverse switch 1132*a* of the auto switch 1013*a*, the control unit 1015 continues to drive the motor 1011*a* and does not drive the motor 1011*b*.

If the forward switch 1131*b* of the auto switch 1013*b* for the back seat 1020*b* is turned ON (Yes in step S1098), and thereafter, the reverse switch 1132*a* of the auto switch 1013*a* for the front seat 1020*a* is turned ON (Yes in step S1099) before the back seat 1020*b* starts the forward movement operation, the control unit 1015 starts to drive the motor 1011*a* and does not drive the motor 1011*b*. If the reverse switch 1132*a* of the auto switch 1013*a* for the front seat 1020*a* is turned ON (Yes in step S1099) while the back seat 1020*b* is moving forward (Yes in step S1098) by the forward switch 1131*b* of the auto switch 1013*b*, the control unit 1015 starts to drive the motor 1011*a* stops driving the motor 1011*b*.

In the fifth embodiment, the backward movement operation of the front seat 1020*a* and the forward movement operation of the back seat 1020*b* are prohibited from being simultaneously carried out by performing the backward movement operation of the front seat 1020*a* by the manual switch 1012*a* in preference to the forward movement operation of the back seat 1020*b* by the auto switch 1013*b*, and thus occurrence of trapping of the object existing between the front seat 1020*a* and the back seat 1020*b* is suppressed. Since the manual operation of the manual switch 1012*a* is based on the assumption that the user is seated, the front seat 1020*a* having a high possibility the user is seated can be operated with preference than the back seat 1020*b* having a possibility the user is not seated, thereby enhancing the convenience of the user.

Other effects of the fifth embodiment are similar to the third embodiment.

(Sixth Embodiment)

The configuration of the seat control device 1010 according to a sixth embodiment of the present invention will now be described with reference to FIG. 15. In the sixth embodiment, the seat control device 1010 in which the forward movement operation of the back seat 1020*b* by the auto switch 1013*b* is performed in preference to the backward movement operation of the front seat 1020*a* by the manual switch 1012*a* is described.

In FIG. 15, the seat control device 1010 according to the sixth embodiment is configured to prohibit the backward movement operation of the front seat 1020*a* and to perform the forward movement operation of the back seat 1020*b* when the reverse switch 1122*a* of the manual switch 1012*a* for the front seat 1020*a* and the forward switch 1131*b* of the auto switch 1013*b* for the back seat 1020*b* are simultaneously pushed. Specifically, the seat control device 1010 is configured such that the control unit 1015 starts to drive the motor 1011*b* and does not drive the motor 1011*a* when the reverse switch 1122*a* and the forward switch 1131*b* are simultaneously turned ON. A case where the reverse switch 1122*a* and the forward switch 1131*b* are simultaneously pushed includes a case where the forward switch 1131*b* is pushed before the front seat 1020*a* starts the backward movement operation after the reverse switch 1122*a* is pushed, and a case where the reverse switch 1122*a* is pushed before the back seat 1020*b* starts the forward movement operation after the forward switch 1131*b* is pushed.

In the sixth embodiment, the seat control device 1010 is configured to prohibit the backward movement operation of the front seat 1020*a* and to continue the forward movement operation of the back seat 1020*b* when the reverse switch 1122*a* of the manual switch 1012*a* for the front seat 1020*a* is pushed during the forward movement operation of the back seat 1020*b* by the forward switch 1131*b* of the auto switch 1013*b*. Specifically, the seat control device 1010 is configured such that the control unit 1015 continues to drive the motor 1011*b* and does not drive the motor 1011*a* when the reverse switch 1122*a* is turned ON during the forward movement operation of the back seat 1020*b* by the forward switch 1131*b*.

In the sixth embodiment, the seat control device 1010 is configured to cancel the backward movement operation of the front seat 1020*a* and to start the forward movement operation of the back seat 1020*b* when the forward switch 1131*b* of the auto switch 1013*b* for the back seat 1020*b* is pushed during the backward movement operation of the front seat 1020*a* by the reverse switch 1122*a* of the manual switch 1012*a*. Specifically, the seat control device 1010 is configured such that the control unit 1015 cancels the drive of the motor 1011*a* and starts to drive the motor 1011*b* when the forward switch 1131*b* is turned ON during the backward movement operation of the front seat 1020*a* by the reverse switch 1122*a*.

Other configurations of the sixth embodiment are similar to the second embodiment.

Figure 23:
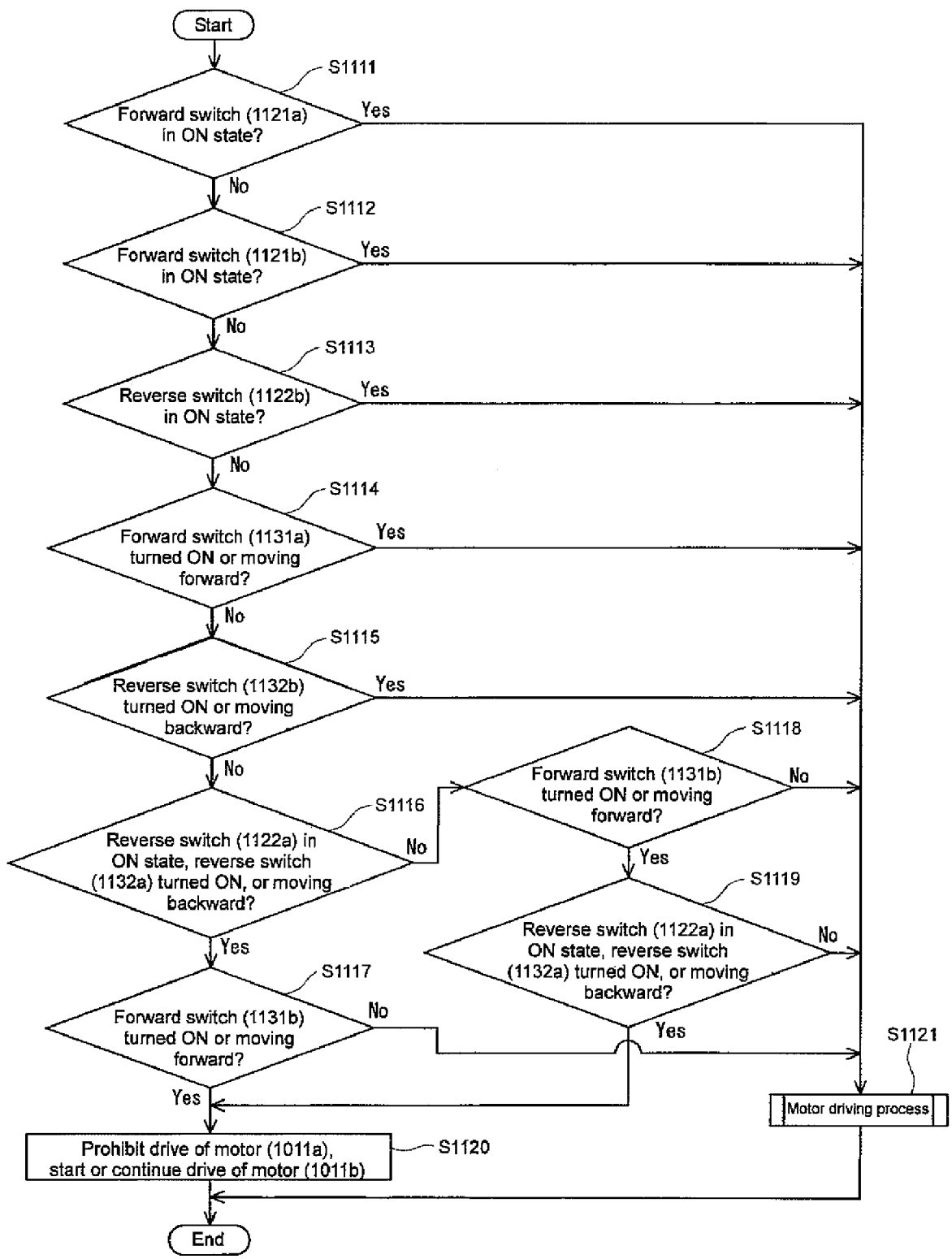
FIG. 23 is a flowchart for describing the operation of the seat control device according to a sixth embodiment of the present invention.

FIG. 23 is a flowchart for describing the operation of the seat control device according to the sixth embodiment of the present invention. The operation of the seat control device 1010 according to the sixth embodiment will be described with reference to FIGS. 15 and 23. The following operations are repeatedly performed in the seat control device 1010. Steps S1111 to S1119, and S1121 of FIG. 23 are similar to steps S1091 to S1099 and S1101 of FIG. 22 described above, and thus the description thereof will not be given.

In the sixth embodiment, the control unit 1015 (see FIG. 15) prohibits the drive of the motor 1011*a* (see FIG. 15) and starts or continues to drive the motor 1011*b* (see FIG. 15) in step S1120 of FIG. 23, and thereafter, the series of operations are terminated. Specifically, if the forward switch 1131*b* (see FIG. 15) of the auto switch 1013*b* for the back seat 1020*b* is turned ON (Yes in step S1117) when the reverse switch 1122*a* of the manual switch 1012*a* for the front seat 1020*a* is in the ON state (Yes in step S1116), the control unit 1015 drives the motor 1011*b* and does not drive the motor 1011*a*. If the forward switch 1131*b* of the auto switch 1013*b* for the back seat 1020*b* is turned ON (Yes in step S1118), and thereafter, the reverse switch 1122*a* of the manual switch 1012*a* for the front seat 1020*a* is turned ON (Yes in step S1119) before the back seat 1020*b* starts the forward movement operation, the control unit 1015 starts to drive the motor 1011*b* and does not drive the motor 1011*a*. If the reverse switch 1122*a* of the manual switch 1012*a* for the front seat 1020*a* is turned ON (Yes in step S1119) while the back seat 1020*b* is moving forward (Yes in step S1118) by the forward switch 1131*b* of the auto switch 1013*b*, the control unit 1015 continues to drive the motor 1011*b* and does not drive the motor 1011*a*.

If the reverse switch 1132*a* (see FIG. 15) of the auto switch 1013*a* for the front seat 1020*a* is turned ON (Yes in step S1116), and thereafter, the forward switch 1131*b* of the auto switch 1013*b* for the back seat 1020*b* is turned ON (Yes in step S1117) before the front seat 1020*a* starts the backward movement operation, the control unit 1015 starts to drive the motor 1011*b* and does not drive the motor 1011*a*. If the forward switch 1131*b* of the auto switch 1013*b* for the back seat 1020*b* is turned ON (Yes in step S1117) while the front seat 1020*a* is moving backward (Yes in step S1116) by the reverse switch 1132*a* of the auto switch 1013*a*, the control unit 1015 stops driving the motor 1011*a* and starts to drive the motor 1011*b*.

If the forward switch 1131*b* of the auto switch 1013*b* for the back seat 1020*b* is turned ON (Yes in step S1118), and thereafter, the reverse switch 1132*a* of the auto switch 1013*a* for the front seat 1020*a* is turned ON (Yes in step S1119) before the back seat 1020*b* starts the forward movement operation, the control unit 1015 starts to drive the motor 1011*b* and does not drive the motor 1011*a*. If the reverse switch 1132*a* of the auto switch 1013*a* for the front seat 1020*a* is turned ON (Yes in step S1119) while the back seat 1020*b* is moving forward (Yes in step S1118) by the forward switch 1131*b* of the auto switch 1013*b*, the control unit 1015 continues to drive the motor 1011*b* and does not drive the motor 1011*a*.

In the sixth embodiment, the backward movement operation of the front seat 1020*a* and the forward movement operation of the back seat 1020*b* are prohibited from being simultaneously carried out by performing the forward movement operation of the back seat 1020*b* by the auto switch 1013*b* in preference to the backward movement operation of the front seat 1020*a* by the manual switch 1012*a*, and thus occurrence of trapping of the object existing between the front seat 1020*a* and the back seat 1020*b* is suppressed.

Other effects of the sixth embodiment are similar to the second embodiment.

(Seventh Embodiment)

The configuration of the seat control device 1010 according to a seventh embodiment of the present invention will now be described with reference to FIG. 15. In the seventh embodiment, the seat control device 1010 in which the backward movement operation of the front seat 1020*a* by the auto switch 1013*a* is performed in preference to the forward movement operation of the back seat 1020*b* by the manual switch 1012*b* is described.

In FIG. 15, the seat control device 1010 according to the seventh embodiment is configured to prohibit the forward movement operation of the back seat 1020*b* and to perform the backward movement operation of the front seat 1020*a* when the reverse switch 1132*a* of the auto switch 1013*a* for the front seat 1020*a* and the forward switch 1121*b* of the manual switch 1012*b* for the back seat 1020*b* are simultaneously pushed. Specifically, the seat control device 1010 is configured such that the control unit 1015 starts to drive the motor 1011*a* and does not drive the motor 1011*b* when the reverse switch 1132*a* and the forward switch 1121*b* are simultaneously turned ON. A case where the reverse switch 1132*a* and the forward switch 1121*b* are simultaneously pushed includes a case where the forward switch 1121*b* is pushed before the front seat 1020*a* starts the backward movement operation after the reverse switch 1132*a* is pushed, and a case where the reverse switch 1132*a* is pushed before the back seat 1020*b* starts the forward movement operation after the forward switch 1121*b* is pushed.

In the seventh embodiment, the seat control device 1010 is configured to continue the backward movement operation of the front seat 1020*a* and to prohibit the forward movement operation of the back seat 1020*b* when the forward switch 1121*b* of the manual switch 1012*b* for the back seat 1020*b* is pushed during the backward movement operation of the front seat 1020*a* by the reverse switch 1132*a* of the auto switch 1013*a*. Specifically, the seat control device 1010 is configured such that the control unit 1015 continues to drive the motor 1011*a* and does not drive the motor 1011*b* when the forward switch 1121*b* is turned ON during the backward movement operation of the front seat 1020*a* by the reverse switch 1132*a*.

In the seventh embodiment, the seat control device 1010 is configured to cancel the forward movement operation of the back seat 1020*b* and to start the backward movement operation of the front seat 1020*a* when the reverse switch 1132*a* of the auto switch 1013*a* for the front seat 1020*a* is pushed during the forward movement operation of the back seat 1020*b* by the forward switch 1121*b* of the manual switch 1012*b*. Specifically, the seat control device 1010 is configured such that the control unit 1015 cancels the drive of the motor 1011*b* and starts to drive the motor 1011*a* when the reverse switch 1132*a* is turned ON during the forward movement operation of the back seat 1020*b* by the forward switch 1121*b*.

Other configurations of the seventh embodiment are similar to the third embodiment.

Figure 24:
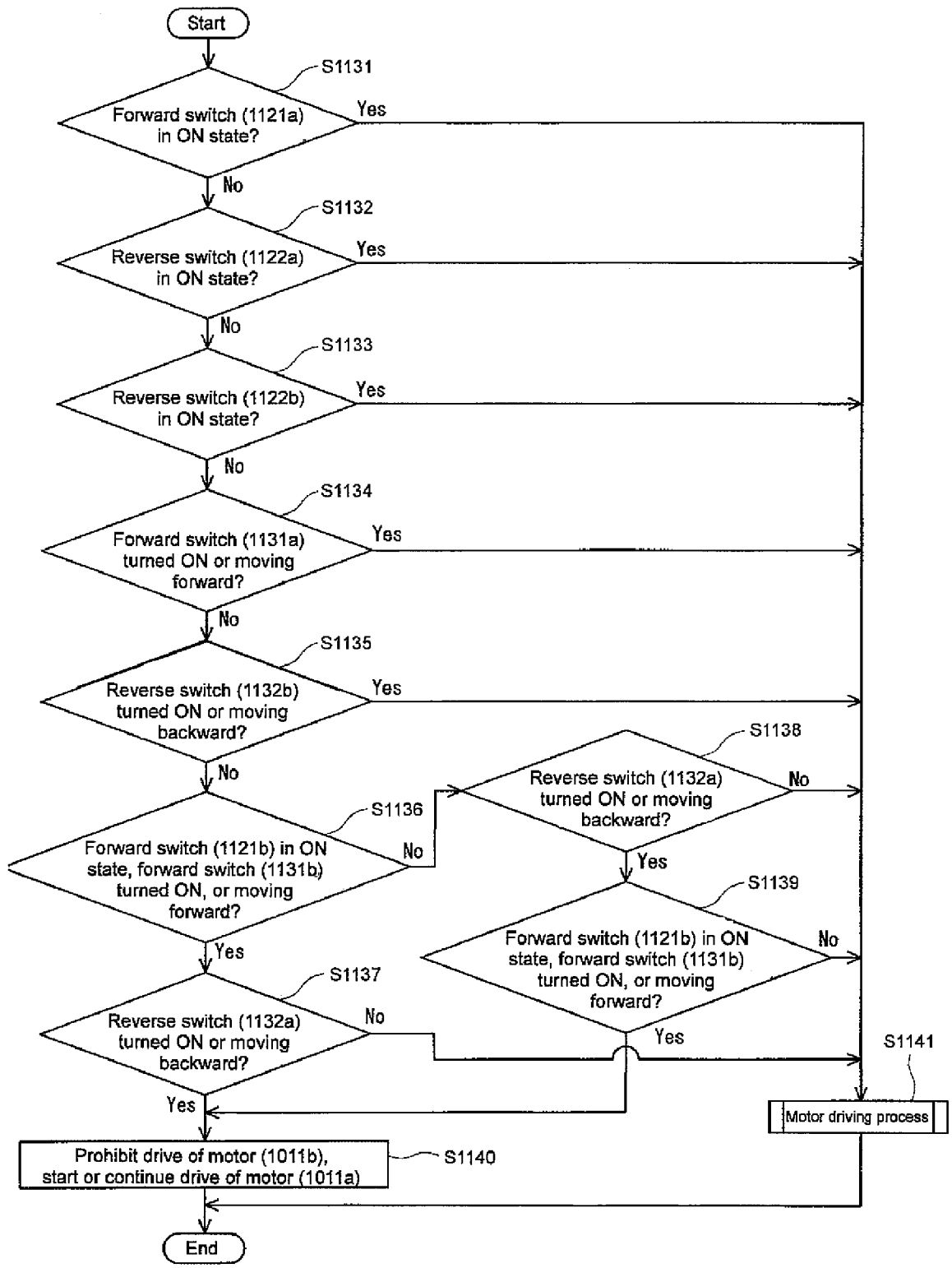
FIG. 24 is a flowchart for describing the operation of the seat control device according to a seventh embodiment of the present invention.

FIG. 24 is a flowchart for describing the operation of the seat control device according to the seventh embodiment of the present invention. The operation of the seat control device 1010 according to the seventh embodiment will be described with reference to FIGS. 15 and 24. The following operations are repeatedly performed in the seat control device 1010. Steps S1131 to S1139 and S1141 of FIG. 24 are similar to steps S1071 to S1079 and S1081 of FIG. 21 described above, and thus the description thereof will not be given.

In the seventh embodiment, the control unit 1015 (see FIG. 15) prohibits the drive of the motor 1011*b* (see FIG. 15) and starts or continues to drive the motor 1011*a* (see FIG. 15) in step S1140 of FIG. 24, and thereafter, the series of operations are terminated. Specifically, if the reverse switch 1132*a* (see FIG. 15) of the auto switch 1013*a* for the front seat 1020*a* is turned ON (Yes in step S1137) when the forward switch 1121*b* (see FIG. 15) of the manual switch 1012*b* for the back seat 1020*b* is in the ON state (Yes in step S1136), the control unit 1015 drives the motor 1011*a* and does not drive the motor 1011*b*. If the reverse switch 1132*a* of the auto switch 1013*a* for the front seat 1020*a* is turned ON (Yes in step S1138), and thereafter, the forward switch 1121*b* of the manual switch 1012*b* for the back seat 1020*b* is turned ON (Yes in step S1139) before the front seat 1020*a* starts the backward movement operation, the control unit 1015 starts to drive the motor 1011*a* and does not drive the motor 1011*b*. If the forward switch 1121*b* of the manual switch 1012*b* for the back seat 1020*b* is turned ON (Yes in step S1139) while the front seat 1020*a* is moving backward (Yes in step S1138) by the reverse switch 1132*a*, the control unit 1015 continues to drive the motor 1011*a* and does not drive the motor 1011*b*.

If the forward switch 1131*b* (see FIG. 15) of the auto switch 1013*b* for the back seat 1020*b* is turned ON (Yes in step S1136), and thereafter, the reverse switch 1132*a* of the auto switch 1013*a* for the front seat 1020*a* is turned ON (Yes in step S1137) before the back seat 1020*b* starts the forward movement operation, the control unit 1015 starts to drive the motor 1011*a* and does not drive the motor 1011*b*. If the reverse switch 1132*a* of the auto switch 1013*a* for the front seat 1020*a* is turned ON (Yes in step S1137) while the back seat 1020*b* is moving forward (Yes in step S1136) by the forward switch 1131*b*, the control unit 1015 starts to drive the motor 1011*a* and stops driving the motor 1011*b*.

If the reverse switch 1132*a* of the auto switch 1013*a* for the front seat 1020*a* is turned ON (Yes in step S1138), and thereafter, the forward switch 1131*b* of the auto switch 1013*b* for the back seat 1020*b* is turned ON (Yes in step S1139) before the front seat 1020*a* starts the backward movement operation, the control unit 1015 starts to drive the motor 1011*a* and does not drive the motor 1011*b*. If the forward switch 1131*b* of the auto switch 1013*b* for the back seat 1020*b* is turned ON (Yes in step S1139) while the front seat 1020*a* is moving backward (Yes in step S1138) by the reverse switch 1132*a* of the auto switch 1013*a*, the control unit 1015 continues to drive the motor 1011*a* and does not drive the motor 1011*b*.

In the seventh embodiment, the backward movement operation of the front seat 1020*a* and the forward movement operation of the back seat 1020*b* are prohibited from being simultaneously carried out by performing the backward movement operation of the front seat 1020*a* by the auto switch 1013*a* in preference to the forward movement operation of the back seat 1020*b* by the manual switch 1012*b*, and thus occurrence of trapping of the object existing between the front seat 1020*a* and the back seat 1020*b* is suppressed.

Other effects of the seventh embodiment are similar to the third embodiment.

The present invention may adopt various embodiments other than the above. For instance, an example where the seat control device 1010 is arranged in the automobile 1100 has been described in the first to seventh embodiments, but is not limited thereto, and the seat control device 1010 may be arranged on trains, and the like.

In the first to seventh embodiments, an example where two rows of seats are arranged in the automobile 1100 has been described, but is not limited thereto, and three or more rows of seats may be arranged in the automobile 1100.

In the first to seventh embodiments, an example where the manual switch 1012*a* and the auto switch 1013*a* are arranged in the front seat 1020*a*, and the manual switch 1012*b* and the auto switch 1013*b* are arranged in the back seat 1020*b* has been described, but is not limited thereto, and the manual switches 1012*a*, 1012*b*, and the auto switches 1013*a*, 1013*b* may be arranged on an operation unit (not shown) at one location.

In the first to seventh embodiments, an example where the auto switch 1013*a* includes the forward switch 1131*a* and the reverse switch 1132*a* has been described, but is not limited thereto, and the auto switch 1013*a* may include a switch for moving the front seat 1020*a* to the set position of the user. In this case, the seat moves to the set position when the switch is pushed such that the difference between the predefined set position and the detection result of the position sensor 1014*a* becomes smaller. The auto switch 1013*a* may include a switch for moving the front seat 1020*a* to the reference position Pa. These are the same for the auto switch 1013*b*.

In the first to seventh embodiments, the forward movement operation of the front seat 1020*a* and the backward movement operation of the back seat 1020*b* may be simultaneously carried out. The forward movement operation of the front seat 1020*a* and the forward movement operation of the back seat 1020*b* may be simultaneously carried out, or the backward movement operation of the front seat 1020*a* and the backward movement operation of the back seat 1020*b* may be simultaneously carried out.

Various embodiments of the present invention other than those described above may be adopted. For instance, the seat control device 1100 is applied to the vehicle 1200 such as the automobile in the above-described embodiments, but is not limited thereto, and the seat control device may be applied to railroad vehicles, boats and ships, and other vehicles.

The vehicle 1200 is a vehicle with three rows of seats in the above-described embodiments, but is not limited thereto, and may be applied to a vehicle having three or more rows of seats, and the above-described seat control may be carried out at each seat in the front and back relationship.

In the above-described embodiment, the input unit for performing the control of the seat is operated by the passenger seated on the relevant seat, but is not limited thereto, and the input unit for performing the control of each seat may be arranged in a concentrated manner at one location, so that the input unit for performing the control of the seat where the passenger is seated and the input unit for performing the control of the seat in the front and back relationship with the relevant seat may be simultaneously operated by one passenger.

What is claimed is:

1. A seat control device comprising:
    a first input unit for performing an operation of moving a first seat to a front side or a back side;
    a first drive control unit for moving the first seat to the front side or the back side based on an output of the first input unit;
    a second input unit for performing an operation of moving a second seat, positioned behind the first seat, to the front side or the back side; and
    a second drive control unit for moving the second seat to the front side or the back side based on an output of the second input unit;
    wherein a control unit is arranged for prohibiting movement of the first seat and the movement of the second seat from being simultaneously carried out when the operation to move the first seat to the back side is performed at the first input unit and the operation to move the second seat to the front side is performed at the second input unit,
    wherein the control unit stops the movement of the first seat based on the output of the first input unit operated before the second input unit, and prohibits the movement of the second seat based on the output of the second input unit operated after the first input unit.

2. The seat control device according to claim 1, wherein the first input unit further comprises:
    a first manual input unit for moving the first seat forward or backward by the first drive control unit while being operated by a user, and
    a first auto input unit for moving the first seat forward or backward by the first drive control unit after being operated by the user;
    the second input unit further comprises:
        a second manual input unit for moving the second seat forward or backward by the second drive control unit while being operated by a user, and
        a second auto input unit for moving the second seat forward or backward by the second drive control unit after being operated by the user; and
    the control unit prioritizes the movement of the second seat based on the output of the second manual input unit over the movement of the first seat based on the output of the first auto input unit, and
    wherein the control unit stops the movement of the second seat based on the output of the second input unit operated before the first input unit, and prohibits the movement of the first seat based on the output of the first input unit operated after the second input unit.

3. The seat control device according to claim 1, wherein the first input unit further comprises:
    a first manual input unit for moving the first seat forward or backward by the first drive control unit while being operated by a user, and
    a first auto input unit for moving the first seat forward or backward by the first drive control unit after being operated by the user;
    the second input unit further comprises:
        a second manual input unit for moving the second seat forward or backward by the second drive control unit while being operated by a user, and
        a second auto input unit for moving the second seat forward or backward by the second drive control unit after being operated by the user; and
    the control unit prioritizes the movement of the second seat based on the output of the second manual input unit over the movement of the first seat based on the output of the first auto input unit, and
    wherein the control unit stops the movement of the second seat based on the output of the second input unit operated before the first input unit, and executes the movement of the first seat based on the output of the first input unit operated after the second output unit.

4. The seat control device according to claim 1, wherein the first input unit further comprises:
    a first manual input unit for moving the first seat forward or backward by the first drive control unit while being operated by a user, and
    a first auto input unit for moving the first seat forward or backward by the first drive control unit after being operated by the user;
    the second input unit further comprises:
        a second manual input unit for moving the second seat forward or backward by the second drive control unit while being operated by a user, and
        a second auto input unit for moving the second seat forward or backward by the second drive control unit after being operated by the user; and
    the control unit prioritizes the movement of the second seat based on the output of the second manual input unit over the movement of the first seat based on the output of the first auto input unit, and
    wherein the control unit executes the movement of the second seat based on the output of the second input unit operated before the first input unit, and prohibits the movement of the first seat based on the output of the first input unit operated after the second output unit.

5. A seat control device comprising:
    a first input unit for performing an operation of moving a first seat to a front side or a back side;
    a first drive control unit for moving the first seat to the front side or the back side based on an output of the first input unit;
    a second input unit for performing an operation of moving a second seat, positioned behind the first seat, to the front side or the back side; and a second drive control unit for moving the second seat to the front side or the back side based on an output of the second input unit;

wherein a control unit is arranged for prohibiting movement of the first seat and the movement of the second seat from being simultaneously carried out when the operation to move the first seat to the back side is performed at the first input unit and the operation to move the second seat to the front side is performed at the second input unit, and wherein the control unit stops the movement of the first seat based on the output of the first input unit operated before the second input unit, and executes the movement of the second seat based on the output of the second input unit operated after the first input unit.

6. A seat control device comprising:

a first input unit for performing an operation of moving a first seat to a front side or a back side;

a first drive control unit for moving the first seat to the front side or the back side based on an output of the first input unit;

a second input unit for performing an operation of moving a second seat, positioned behind the first seat, to the front side or the back side; and a second drive control unit for moving the second seat to the front side or the back side based on an output of the second input unit;

wherein a control unit is arranged for prohibiting movement of the first seat and the movement of the second seat from being simultaneously carried out when the operation to move the first seat to the back side is performed at the first input unit and the operation to move the second seat to the front side is performed at the second input unit, and wherein the control unit executes the movement of the first seat based on the output of the first input unit operated before the second input unit, and prohibits the movement of the second seat based on the output of the second input unit operated after the first input unit.

* * * * *